United States Patent [19]
Seazholtz et al.

[11] Patent Number: 6,128,489
[45] Date of Patent: *Oct. 3, 2000

[54] USE OF CELLULAR DIGITAL PACKET DATA (CDPD) COMMUNICATIONS TO CONVEY SYSTEM IDENTIFICATION LIST DATA TO ROAMING CELLULAR SUBSCRIBER STATIONS

[75] Inventors: John W. Seazholtz, Great Falls; Robert D. Farris, Sterling, both of Va.

[73] Assignee: Bell Atlantic Network Services, Inc., Arlington, Va.

[ * ] Notice: This patent is subject to a terminal disclaimer.

[21] Appl. No.: 09/276,751

[22] Filed: Mar. 26, 1999

Related U.S. Application Data

[62] Division of application No. 08/566,983, Dec. 4, 1995.

[51] Int. Cl.[7] .............................. H04Q 7/20; H04M 3/00; H04B 7/00; H04J 3/24
[52] U.S. Cl. ........................ 455/432; 455/433; 455/419; 455/525; 455/434; 455/435; 455/466; 370/349
[58] Field of Search ...................... 455/426, 466, 455/432, 433, 553, 434, 423, 455, 525, 419; 370/349

[56] References Cited

U.S. PATENT DOCUMENTS

| | | |
|---|---|---|
| 3,655,991 | 4/1972 | Schneider . |
| 3,824,404 | 7/1974 | Ghere . |
| 4,074,145 | 2/1978 | Laffoon et al. . |
| 4,679,244 | 7/1987 | Kawasaki et al. . |
| 5,109,530 | 4/1992 | Stengel . |
| 5,140,698 | 8/1992 | Toko . |
| 5,150,362 | 9/1992 | Akerberg . |
| 5,159,625 | 10/1992 | Zicker . |
| 5,175,439 | 12/1992 | Härer et al. . |
| 5,196,728 | 3/1993 | Jaux . |
| 5,241,568 | 8/1993 | Fernandez et al. . |
| 5,255,179 | 10/1993 | Zekan et al. . |
| 5,297,191 | 3/1994 | Gerszberg . |
| 5,353,331 | 10/1994 | Emery et al. . |
| 5,382,949 | 1/1995 | Mock et al. . |
| 5,404,392 | 4/1995 | Miller et al. . |
| 5,451,839 | 9/1995 | Rappaport et al. ............ 455/423 |
| 5,463,675 | 10/1995 | Gerszberg . |
| 5,502,721 | 3/1996 | Pohjakallio . |
| 5,504,803 | 4/1996 | Yamada et al. ............ 455/426 |
| 5,517,673 | 5/1996 | Fehnel ............ 455/434 |
| 5,533,019 | 7/1996 | Jayapalan . |
| 5,533,029 | 7/1996 | Gardner . |
| 5,586,338 | 12/1996 | Lynch et al. ............ 455/433 |
| 5,613,204 | 3/1997 | Haberman et al. ............ 455/432 |
| 5,696,760 | 12/1997 | Hardin et al. ............ 455/466 |
| 5,711,008 | 1/1998 | Gallant et al. ............ 455/466 |
| 5,737,706 | 4/1998 | Seazholtz et al. ............ 455/466 |
| 5,761,618 | 6/1998 | Lynch et al. ............ 455/419 |
| 5,790,952 | 8/1998 | Seazholtz et al. ............ 455/432 |
| 5,819,184 | 10/1998 | Cashman ............ 455/553 |
| 5,920,821 | 7/1999 | Seazholt et al. ............ 455/466 |

Primary Examiner—Dwayne D. Bost
Assistant Examiner—Raymond Persino
Attorney, Agent, or Firm—McDermott, Will & Emery

[57] ABSTRACT

An analog cellular voice telephone system and subscriber stations associated therewith are controlled to conserve power and to provide alternate service carriers. Acquisition of all of the service carriers is facilitated through the use of system identification numbers (SIDs) associated with each service carrier. A roaming subscriber will tune to a cellular digital packet data (CDPD) frequency to obtain a list of service carriers operating within that geographical area. Based upon a comparison with a preferred SID list stored in the subscriber station, an available service carrier will be selected by the subscriber station, and registration with the selected service carrier will take place. Usually, analog voice communication is suspended until the selection process takes place.

4 Claims, 11 Drawing Sheets

USE OF CELLULAR DIGITAL PACKET DATA (CDPD) COMMUNICATIONS TO CONVEY SYSTEM IDENTIFICATION LIST DATA TO ROAMING CELLULAR SUBSCRIBER STATIONS

This application is a divisional of application Ser. No. 08/566,983 filed Dec. 4, 1995.

TECHNICAL FIELD

The present invention relates generally to subscriber cellular mobile radiotelephones. More specifically, the present invention is related to methods for efficiently registering cellular subscriber stations by automatically downloading system data pertaining to preferred foreign cellular providers with which the cellular subscriber stations can communicate.

BACKGROUND ART

The modern analog cellular system for mobile wireless duplex voice transmission called "Advanced Mobile Phone Service" (AMPS), uses the FCC assigned carrier frequency range of 800 to 900 MHz. Automobile-mounted cellular units transmit voice signals to a cellular base station within a given cell at up to one watt of power. Battery powered, hand-held cellular units transmit voice signals to a cellular base station within a given cell using up to one quarter watt of transmission power.

Despite the relatively low power output of the hand-held subscriber station, sustained power use and resulting decreased battery life is a major problem. Since a battery in a standard subscriber terminal is expected to last approximately one month, additional power drainage resulting in loss of battery life imposes substantial hardship on any subscriber using a portable handset. This problem is one of the major issues confronting designers of cellular handsets and systems today.

Conventional cellular subscriber stations are capable of communicating on at least one of two independent sets of frequencies. However, a conventional cellular base system normally communicates on only one of these two sets of frequencies. Thus, a cellular base system may be referred to as an "A" system if it uses one set of frequencies or a "B" system if it uses the other set of frequencies. This dual-system approach to radiotelephony results from regulations which are intended, at least in part, to promote competition in providing radiotelephone services.

When "A" and "B" cellular systems are both located in a single geographic area, radiotelephone service customers may choose to subscribe to either the "A" or "B" system in accordance with which system provides the best value to the customer. "B" systems are often referred to as "wireline" carriers because "B" systems are typically operated by the companies that provide wireline telecommunication services where the "B" systems are located. "A" systems are often referred to as non-wireline carriers because they are operated by companies other than the companies that operate the competing "B" systems. These frequency allocations are not necessarily permanent.

Each frequency set in a given cellular service area is assigned to one and only one carrier. However, in different service areas the same frequency set may be assigned to different carriers (much as a television channel may be assigned to an affiliate of one network in one city and to an affiliate of another network in another city).

The home frequency set of a given telephone unit is the set of frequencies which the unit will ordinarily attempt to use. This will depend in large part on which carrier is subscribed to by the telephone unit's user: if the user is a subscriber of a nonwireline carrier, the user's home frequency set will be the "A" frequencies, and vice versa.

As is well-known to those of ordinary skill in this field, a frequency set typically includes paging channels and associated signalling or control channels, as well as voice channels. The paging and control channels are used for preliminary coded communications between a cellular telephone and a cell site or base station in setting up a telephone call, after which a voice channel is assigned for the telephone's use on that call.

Each cellular carrier broadcasts a unique System Identification Number (SID) on all paging channels of the frequency sets on which it provides service in a given service area. A suitably equipped cellular subscriber station can thus determine which carrier is providing service on a given paging channel by identifying the SID. Usually the SID contains three digits.

Identification of a home SID is not necessarily required to be able to place a cellular call. Many carriers have reciprocal billing arrangements with one another, meaning that a call can be placed on a frequency associated with a non-home cellular system. However, use of a non-home carrier in this manner to place a call may result in the imposition of a surcharge (e.g., a fixed surcharge or a higher per-unit rate).

Furthermore, if the non-home carrier does not have a reciprocal billing arrangement with the user's home carrier, as a practical matter the user may not be able to place a call at all. Even though the telephone unit is capable of establishing a connection via the carrier signal, the non-home carrier's switching equipment typically will not allow the user to do anything with the connection without a way to bill the user for his or her usage. Some carriers automatically switch calls of this kind to an operator who can take down a credit card number. However, absent a billing arrangement of some kind, no call can be completed.

When a customer subscribes to a cellular system (either an "A" or "B" system), that system becomes the subscriber/customer's home system. The company that operates a customer's home system collects billing information and bills the customer for the customer's use of the home system's radiotelephone services. Whenever a customer is operating his or her cellular subscriber stations on a system other than the customer's home system, the customer is engaging in an activity known as roaming. The cellular system upon which a roaming cellular subscriber station is operating is viewed as a foreign system.

Subscribers may receive cellular telecommunication services while roaming. However, the home cellular carrier and the foreign cellular carrier must cooperate with one another before roaming services are permitted. For example, the foreign system must transfer call record information to the home system, and the home system must bill for, collect funds for, and distribute funds back to the foreign system for the roaming telecommunication services. Accordingly, the customer must typically pay additional charges when the customer uses roaming services.

When the customer operates his or her cellular subscriber station in the area covered by the cellular subscriber's home system, no serious cellular base system selection choice needs to be made. The customer will almost always want to use the home system because the charges for home-system telecommunication services will be less. On the other hand, when the customer is roaming away from the home system, a choice of whether to operate a cellular subscriber station on an "A" or "B" foreign system must be made.

Conventional cellular subscriber station handsets employ any one of several different programmable selection processes in choosing a cellular system upon which to operate. For example, a cellular subscriber station may prefer an "A" system but accept a "B" system if an "A" system is not available. This is called an "A/B" selection process. Conversely, a cellular subscriber station may prefer a "B" system but accept an "A" system if a "B" system is not available. This is called a "B/A" selection process. Alternatively, a cellular subscriber station may select only "A" systems ("A"-Only) or only "B" systems ("B"-Only) regardless of whether a competing system is available. Furthermore, a cellular subscriber station may select only the home system so that roaming is prohibited. Other selection processes may be implemented as well. A cellular subscriber station will typically utilize a default selection process which is consistent with its home system. For example, if a cellular subscriber station's home system is an "A" system, then the cellular subscriber station will typically utilize the "A" -Only or "A/B" selection processes as a default selection process.

Conventional cellular subscriber station handsets permit alteration of the default selection process. However, this feature is not often used by customers because it is difficult to accomplish through a cellular subscriber's station handset and because an intelligent nondefault selection process setting requires an understanding of cellular radiotelephony that many customers do not possess. Accordingly, providers of cellular services recognize that, for the most part, customers do not alter the default process selection setting.

The default selection process setting tends to limit any benefits that competition between "A" and "B" systems may provide while roaming. While the default setting favors the home system, at the same time it favors approximately one half of the numerous potential foreign systems over the other half of potential foreign systems. Assuming that this default setting does not change, in providing radiotelephone services to roaming customers one of each foreign area's two competing cellular systems benefits from an equipment-caused bias. As a result, the favored foreign systems need not aggressively price roaming services, and they need not be exceptionally cooperative with a roamer's home system, because it is highly probable that a roamer will use the favored foreign system regardless of cost. Consequently, roaming costs to a customer remain undesirably high.

While conventional cellular subscriber's station handsets can be configured so that the default system selection process setting is easily alterable, such configurations do not solve the problems faced by roaming customers. A typical customer is not prepared to make, or interested in making, a purchasing decision with respect to telecommunication services every time he or she is roaming. While roaming, a customer is unlikely to know the rates charged by the competing foreign cellular systems. Moreover, the rate structures may be complicated, and they may change from time to time. Thus, when a customer is roaming, he or she typically does not possess sufficient information upon which to base an intelligent foreign cellular system selection decision, even if the cellular subscriber station has the capacity for such a selection. Typically the subscriber does not desire to go to the time and trouble to obtain this information, and make the necessary alterations in the operation of the cellular subscriber station.

Further, the time required by the subscriber to make the aforementioned selections requires an expenditure in energy, and a resulting decrease in battery life. Consequently, a need exists for an efficient technique for channel selection that carries out the desires of the roaming subscriber. Even if the channel selection is limited between only the "A" and "B" bands, there are additional options that can be selected by the cellular subscriber. These further complicate the selection process which is carried out in the high-power AMPS mode of communication.

One such additional option for the aforementioned band selection is constituted by a personal communication system (PCS). When this type of system is used, predetermined frequencies (in addition to the "A" and "B" bands) are set aside for this type of operation. A full description of PCS operation is disclosed in U.S. Pat. No. 5,353,331 issued Oct. 4, 1994 to Emery et al., and assigned to Bell Atlantic Network Services, Inc. (a common assignee with that of the present application), incorporated herein by reference. The use of PCS as a third alternative is increasing in many locations and may some day be a standard third alternative to the existing "A" and "B" frequency bands.

The PCS handset has the capability of interfacing with a standard cellular base station, usually at the user's home, a local cellular system in which the user's home is located, additional cellular systems having access to the AIN, local microcell systems and any wireless Centrex/PBX to which the handset has been previously granted access. In order for the handset to gain access to the local cellular MC and microcell type PCS MC, both must be set up to transmit the same system ID (SID) and to indicate combined paging and access channels.

In order for the handset of the PCS to access its own base station as well as the macrocell MC and the microcell MC, the handset must operate at cellular frequencies. The scanning function of the handset is prioritized so as to register with its personal base station first. If the base station is not contacted the handset scans the macrocell and microcell control channels, selecting to register with the MC of the microcell system if detected before attempting to register with the MC of the macrocell system. If the handset has been granted access to a wireless Centrex system, it scans a set of control channels specially programmed into the handsets of Centrex members only. Selection of one of these special channels must be done by the specific action of the handset user, and additional handshake procedures may be carried out requiring a personal identification number (PIN) from the user before he or she is permitted to interface with the wireless Centrex.

The PCS home base station is structurally similar to prior art cordless telephone base stations, except that the transceiver in the base station operates at cellular frequencies and uses signalling protocols similar to those of the cellular network to perform registration procedures. Of particular note here, the base station includes a microprocessor for programmed control of base station operations. To perform registration with the ISCP, the base station also includes an auto dialer, and may include means to detect call progress tones and/or certain instruction signals from the telephone network.

The existence of additional types of systems such as the aforementioned PCS mode of communications further complicates the selection process as previously stated. Further, the power levels required for additional systems such as PCS may vary from the power levels required for the "A" and "B" cellular bands. Consequently, an increased range of power level becomes appropriate for subscriber station handsets. This, of course, increases control problems and the necessity for a predetermined coherent program of power control to optimize battery life in a cellular subscriber station handset.

The use of additional systems such as PCS also necessitate the acquisition by subscriber station handsets of additional control information pertaining to the available systems. The reasonable response to the existence of multiple available systems and modes of communication is the existence of multi-level, programmable power supplies in wireless subscriber handsets. Adjustable power supplies for servicing portable and mobile radio telephone units are well known in the conventional art. A number of examples are listed as follows.

U.S. Pat. No. 4,679,244 to Kawasaki et al. is directed to a method of transmitting terminating call signals within a restricted duration. This system also includes a base station in a portable unit arranged for particular use with the subject method. The system is arranged so that a portable unit may be called from a base station through a radio control channel by a succession of terminating call signals. The terminating call signals are sent through the control channel from the base station to portable unit for a first or restricted time duration ($T_1$). This time duration is selected in consideration of a battery saving period calculated to save battery power within the portable unit. During the battery saving period, the portable unit is put into transient active and inactive states during a first time interval and a second time interval, respectively. The first time interval is longer than the second time interval so that the portable unit receives at least one of the terminating call signals during the first time interval. The base station monitors an acknowledgement signal for a second time duration ($T_2$) after the lapse of the first time duration ($T_1$), and interrupts the control channel when the acknowledgment signal is not received within the first and second time durations ($T_1$, $T_2$). In the portable unit, the battery saving operation is halted when the presence of the terminating call signal is detected by a squelch circuit. The effect of this operation is that the portable unit is periodically put into a transient active state and a transient inactive state by the battery saver circuit.

U.S. Pat. No. 5,109,530 to Stengel is directed to a radio receiver with a battery saving system. The receiver goes into a "sleep mode" in response to a monitored signal. The receiver is used for recovering modulation signals and includes a detector and a decoder for detecting the presence of a non-valid coded squelch signal and decoding such a signal in the recovered modulation signal. The receiver further includes a synchronizer for synchronizing the detected non-valid coded signal. The receiver is placed in a battery saving mode when a non-valid coded squelch signal is detected. The battery saver mode includes monitoring the recovered modulation signal for a change in the non-valid coded squelch signal. At which point, the battery saver mode ends.

U.S. Pat. No. 5,241,568 to Fernandez et al. is directed to a method and apparatus for synchronizing a receiver to transmit a signal while conserving power in that receiver. The method operates so that a receiver receives a transmitted signal having a first predetermined signal for indicating a start of a new transmission to the receiver. The transmitted signal has a second predetermined signal inserted at periodic sampling time intervals for synchronizing receiver to the transmitted signal. The receiver synchronizes to the transmitted signal by detecting the first predetermined signal followed by the second predetermined signal and establishing subsequent periodic sampling time intervals therefrom. The receiver manages to conserve power during a second portion of the periodic sampling time interval following the detection of a first portion of the second predetermined signal during a first portion of the periodic sampling time interval. If the receiver does not detect the first portion of the second predetermined signal, then the receiver searches for a portion of the first predetermined signal during the second portion of the periodic sampling time interval to determine a possible start of a new transmission. Power conservation can also be achieved by inhibiting the receiving circuitry, the decoding means and disabling other non-essential circuits and functions in the receiver during a "sleep cycle". Essentially, the receiver is shut down during certain preassigned frames.

U.S. Pat. No. 5,382,949 to Mock et al. is directed to a method for increasing battery life for selective call receivers. The selective call receiving system includes a base sight which transmits paging information having a plurality of batches. The base sight comprises a timer for calculating a time between a first of the least two successive paging transmissions and a counter for counting a number of batches to be transmitted in the subject paging transmissions. A base sight processor coupled to the timer counter processes the paging information. The base sight processor comprises an encoder for encoding a portion of the first of the successive paging transmissions with the calculated time and the number of batches to be transmitted in the first page in transmission. A base sight transmitter coupled to the base sight processor transmits the successive paging transmissions according to the calculated time to a plurality of selective call receivers. A selective call receiver comprises a receiver for receiving the paging transmissions, and a decoder coupled to the receiver for decoding the number of batches being transmitted therein, as well as a time to a next paging transmission. A power switch is coupled to the decoder for disabling and enabling a power supply to the receiver in order to receive an assigned frame of the plurality of transmission batches. The power switch is responsive to the plurality of batches being decoded so as to disable or enable the power supply to the receiver in order to receive successive paging transmissions.

U.S. Pat. No. 5,196,728 to Jaux is directed to a method of controlling a network of electronic stations. The method encompasses the use of a sleep mode when no active function of the network is indicated. In effect, the system is put into an active mode or a sleep mode based upon various electric loads placed upon the electrical system in a motor vehicle. The method operates to generate an activation signal in at least some of the stations in the network when a previously inactive function is requested. The system also generates a deactivation signal when an associated previously active function is to be deactivated. The system further operates to detect the generated activation and deactivation signals incrementing at least one counter by one step each time when the associated activation signal is detected. Likewise, the system operates to decrement the same counter by one step each time an associated deactivation signal is detected. A sleep signal is finally generated when a counter reaches a zero count after being decremented.

U.S. Pat. No. 5,140,698 to Toko is directed to a mobile telephone system with intermittent control of receiver components in a standby state. The mobile telephone system operates to send an intermittent signal to a power switch during a standby state so that power is turned on during the period when a necessary signal portion of a control signal derived from a signal receiving portion is input. The power switch is turned off during a period when an unnecessary signal portion of the control signal is input. Thus, the components of the signal receiving portion have short rise times and thus, short time intervals between the activation of the power source and the start of the operation. The use of intermittent power supplied to the system reduces power consumption.

U.S. Pat. No. 5,255,179 to Zekan et al. is directed to a switched mode power supply for a single-phased boost in the range of 1 kw to 10 kw AC. The power supply includes a DC-AC power converter which is connectable to a DC source and includes a first and second pair of switches which convert the DC source directly to AC. This is done by alternately switching between each of the first pair of switches at high frequency modulation and between the second pair of switches alternately switching at each of the half cycles of the low frequency fundamental output voltage. The result is a positive pulse train and a negative pulse train. A transformer boost is a source voltage to the desired high voltage of the output of the converter circuit. A filter is connectable to an AC load and has a plurality of damping modes for extracting fundamental frequency from the output of the transformer. The filter is operated responsive to a signal for switching between damping modes. A sine wave oscillator generates a sine wave at the fundamental frequency. Feedback circuits maintain the AC output at the fundamental frequency. Thus, the system is capable of generating a regulated DC output or a 60 Hz high voltage AC output.

U.S. Pat. No. 4,074,145 to Laffoon et al. is directed to an electric power generating apparatus incorporating an automobile alternator operable in a high voltage mode suitable for providing power for hand tools. The generator also operates in a low voltage mode suitable for maintaining the charge of a battery which provides a field current for the alternator. A switching circuit manually or automatically actuable to place the generator in the high voltage mode of operation interposes a voltage regulator in the field current circuit and connects the output of the alternator to the battery to charge the battery when the generator is operated in the low voltage mode. The switching circuit also interposes a variable resistor in the field current circuit and disconnects the battery from the output of the alternator to permit adjustment of the output voltage of the alternator when the generator is operated in the high voltage mode.

U.S. Pat. No. 5,175,439 to Harer et al. is directed to a power supply circuit for a motor vehicle. The power supply includes a 24 volt battery, a bi-directional converter, a combination of a starter/generator, and a rectifier/inverter. After start-up, the output of the generator is rectified by the diodes of the rectifier/inverter to provide 300 volts DC. A DC/AC inverter converts the 300 volt DC to 220 volts, 60 Hz AC. The bi-directional converter steps-down the 300 volt DC to 240 volt DC in order to provide power for other DC applications. An additional AC/DC rectifier supplies 5 volts DC–12 volts DC. The system also has the capability of providing 220 volts AC at 50 Hz.

U.S. Pat. No. 3,655,991 to Schneider is directed to a power output unit and a method for operating that unit to deliver constant frequency, constant voltage AC power. The power output unit is used as an accessory with an engine-powered vehicle having a conventional electrical system including a battery, voltage regulator and a dynamo which during normal operation supplies DC power to the vehicle electrical system. The system includes switches adapted to isolate the dynamo from the vehicle electrical system, and means for boosting the DC voltage output from the dynamo, as well as converting it to a constant frequency AC voltage. An outlet receptacle is provided to accept jacks from power tools or appliances having constant frequency AC voltage power requirements. The outlet receptacle voltage is monitored and the dynamo field current is adjusted in response to variations therein to control the dynamo voltage and the current input to the accessory unit.

U.S. Pat. No. 3,824,404 to Ghere is directed to a power output device for conversion of a vehicle alternator electrical system to supply electrical power for the operation of lighting fixtures, hand tools, etc. The power output means is connected to the normal vehicle ignition and includes a master switch connected to a voltage control assembly and current control assembly to achieve a power output at an output receptacle. The power output receptacle is regulated regardless of the vehicle engine speed.

Many of the aforementioned examples of multi-power level power supplies are programmable and thus, can accommodate a variety of power levels commensurate with different operating modes. However, none of the aforementioned systems is programmed to optimize power use in the selection of operating bands for a roaming wireless subscriber. Nor is there any conventional program or arrangement in selecting the operating mode most appropriate for a particular communications activity in order to increase battery life. Such optimization programs would greatly reduce unnecessary power use and thus, increase battery life for wireless cellular subscriber station handsets.

DISCLOSURE OF THE INVENTION

One object of the present invention is to decrease power expenditure for roaming cellular subscriber station handsets.

Another object is enhanced coordination between analog cellular voice communication and CDPD communication.

Still another object is the efficient selection from among available service providers or carriers, the carrier most advantageous to a roaming subscriber station.

Yet another object is to efficiently provide operating data to analog cellular voice subscriber stations without incurring the limitations of the analog cellular voice mode of operation.

These and other objects of the present invention are achieved by a first aspect of the present invention including a radio telephone subscriber unit arranged for use in a communication system. The communication system uses a plurality of frequencies divided into a plurality of available frequency bands. The radio telephone subscriber unit includes a controller, and the controller includes means for scanning a cellular digital packet data (CDPD) radio frequency for a list of system identification numbers (SID) where each SID is associated with one of a plurality of available radio frequency bands. The controller also includes means for comparing the scanned SIDs to a list of preferred SIDs stored in the radio telephone subscriber unit. The controller further includes means for selecting a single scanned SID based upon the list of preferred SIDs stored in the radio telephone subscriber unit, as well as means for acquiring a radio frequency carrier corresponding to the frequency band of the selected single scanned SID.

Another aspect of the present invention includes a system for downloading data to radio telephone subscriber units that includes control means for updating at least one data list to be downloaded to the radio telephone subscriber units and generating a version number corresponding to a most-current data list. The system includes means for broadcasting the version number to the radio telephone subscriber units on a CDPD frequency. Each of the participating radio telephone subscriber units includes means for receiving the version number and means for comparing the received version number to a version number previously stored in that radio telephone subscriber unit. Each of the radio telephone subscriber units also includes means for initiating via a CDPD channel a download of the data list based upon a comparison of the version numbers.

A further aspect of the present invention is a system for downloading data to radio telephone subscriber units that includes control means for updating a data list to be downloaded to the radio telephone subscriber units and means for generating a version number corresponding to the data list. The system also includes means for broadcasting the version number over a CDPD channel, and means for downloading the data list to the radio telephone subscriber units within range of the means for downloading. The system further includes means for sequentially addressing each of the radio telephone subscriber units detected to be within range of the means for downloading, as well as means for initiating download of the data list to detected radio telephone subscriber units.

An additional aspect of the present invention, is a method for downloading data to radio telephone subscriber units that includes steps of generating a data list and a version number corresponding to that data list. The version number is then broadcast to a plurality of radio telephone subscriber units via a CDPD channel. A comparison is made of a received version number to a pre-stored version number at each of the radio telephone subscriber units. As a result of a comparison in which the pre-stored version number does not correspond to the received version number, a download of the data list is initiated via a CDPD channel.

Still a further aspect of the present invention is a method of selecting a system provider for a radio telephone communication on at least one of a plurality of radio frequency bands by a radio telephone subscriber unit. The method carried out by the subscriber unit includes scanning a CDPD channel for a list of SIDs where each SID is associated with each of a plurality of available radio frequency bands. The subscriber station then compares the scanned SIDs to a list of preferred SIDs stored in the radio telephone subscriber unit. Based on a comparison, the radio telephone subscriber unit selects a single scanned SID. After the selection, the radio telephone subscriber unit acquires a radio frequency carrier corresponding to a control channel of the selected single scanned SID.

Another aspect of the present invention includes a registration system for a radio telephone communication system servicing a plurality of radio telephone subscriber units arranged for communication with a plurality of cell sites over a plurality of radio frequencies divided into frequency bands. The registration system includes means for generating a system identification number (SID) associated with each radio telephone service provider in the radio telephone system. Each of the participating radio telephone subscriber units includes means for scanning a CDPD frequency for at least one SID associated with each of a plurality of available frequency bands. Each of the radio telephone subscriber units also includes means for selecting a single scanned SID based upon a comparison of scanned SIDs with a list of preferred SIDs stored in the radio telephone subscriber unit. Using the selected single scanned SID, the subscriber station then carries out a communication function.

A further aspect of the present invention includes a method of registering a radio telephone subscriber unit on an analog cellular voice radio telephone communication system where the analog cellular voice communication system includes a plurality of cell sites for communication with a plurality of radio telephone subscriber units over a plurality of radio frequencies divided into frequency bands. The analog cellular voice communication system is controlled by at least one controller which generates a SID associated with each of the plurality of radio frequency bands and service carriers associated therewith. The controller initiates a broadcast of a list of the generated SIDs on a CDPD channel in a predetermined data stream. The data stream is constituted by: an initial block with recognition data; temporary equipment identifier (TEI) data; system control data; communication information data; channel identification data; and the generated SID list. The method is further carried out at a radio telephone subscriber unit which selects an SID based upon a comparison of the generated SID list received by the radio telephone subscriber unit and a list of preferred SIDs stored in the radio telephone subscriber unit. The radio telephone subscriber unit then registers with an analog cellular voice system corresponding the selected SID. After registration, the radio telephone subscriber unit goes into the sleep mode with respect to CDPD operation.

BEST MODE FOR CARRYING OUT THE INVENTION

The SID list referred to in the Background portion of this application is received by roaming subscriber stations from a broadcast device in a foreign system. The broadcast is carried out over a cellular digital packet data (CDPD) channel. CDPD systems operate in accordance with the CDPD Specification, Version 1.1, incorporated by reference in this application. In order for this system to provide its benefits, the subscriber station must be preprogrammed not only for the use of the SID list but also to obtain the SID list data from over the CDPD channel before any analog cellular voice activity is carried out.

The three major components constituting the present invention are explained in detail below. The first component of the present invention is constituted by the operation of a standard cellular handset pre-programmed to use a SID list. This component of the present invention also addresses the transmission and updating of the SID list data. The second component of the invention is constituted by an overview of CDPD communications that can be used to send SID list data from the system to roaming subscriber stations. The third component of the present invention is constituted by the modifications in the subscriber station handsets in order to accommodated CDPD operation, and to regulate analog cellular voice operation with respect to SID list data received over a CDPD channel.

The Use of a SID List

Figure 1:
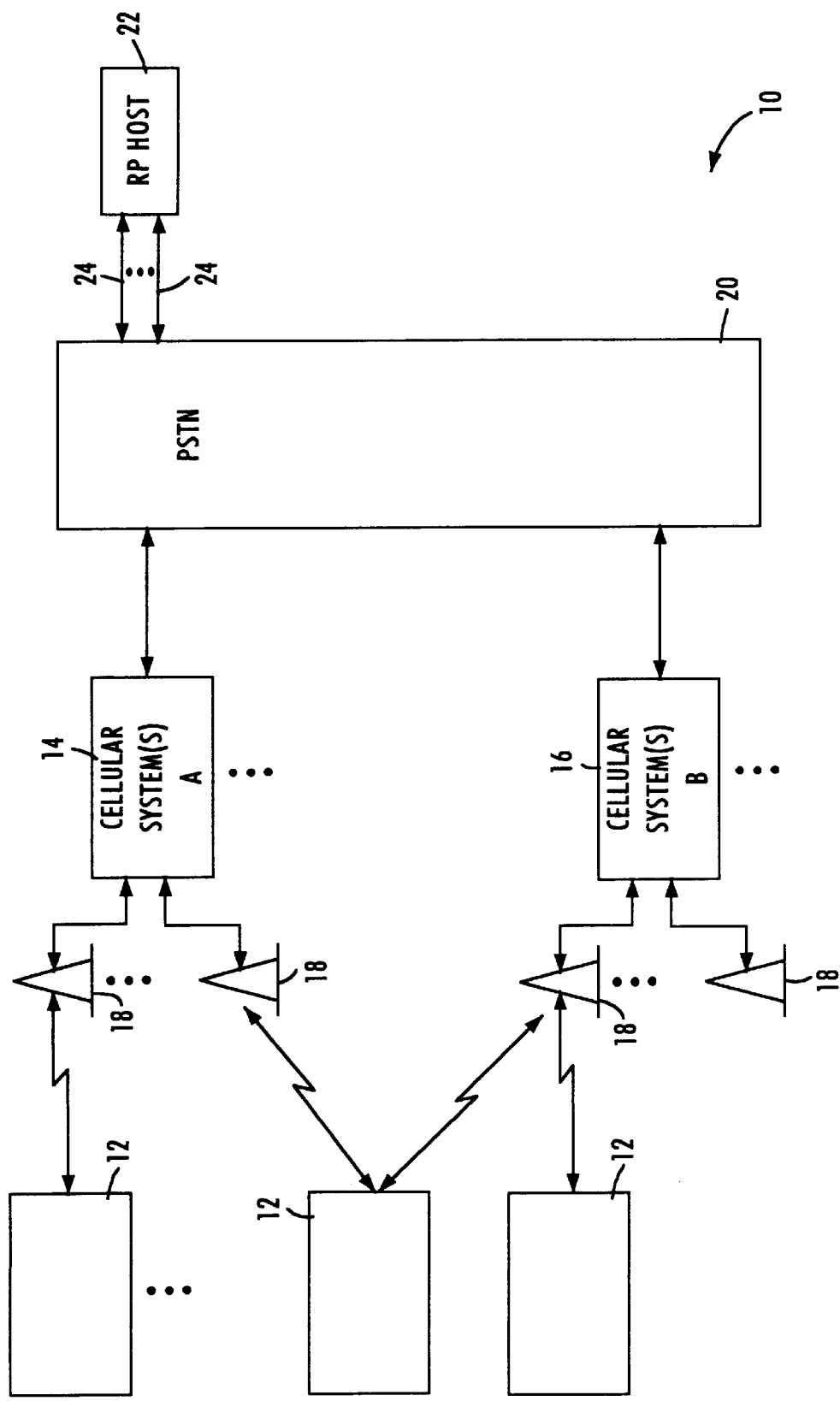
FIG. 1 is a block diagram of a cellular radiotelephone system that is capable of supporting the present invention.

FIG. 1 is a block diagram depicting a cellular radiotelephone system 10 within which the method of the present invention can be practiced. System 10 includes a multiplicity of cellular subscriber stations 12. The precise number of cellular subscriber stations 12 is not a critical feature and may range from a few to many tens of thousands. As is typical, each of cellular subscriber stations 12 is capable of communicating with either an "A" type cellular system 14 or a "B" type cellular system 16. Those skilled in the art understand that A cellular systems communicate over a first set of predetermined frequencies while "B" cellular systems communicate over a second set of predetermined frequencies, the first and second sets being selected so that interference between the two sets is avoided.

Cellular systems 14 and 16 each include several cells represented by antennas 18. Communication coverage over a geographic area is achieved through frequency manipulation between the cells. Both an "A" system 14 and a "B" system 16 may reside in a single geographic area. When a cellular subscriber station 12 has subscribed to service at one of systems 14 and 16 in a single geographic area, that system is a home system for the cellular subscriber station 12. Any other systems in the home geographic area, as well as systems 14 and 16 located in all other geographic areas are foreign systems to the cellular subscriber station 12. As is well-known, when cellular subscriber station 12 is operating in a foreign system, cellular subscriber station 12 is in the roaming state.

All of "A" systems 14 and "B" systems 16, regardless of their designation as a home or foreign system, couple to and operate as an integral part of the public switched telecommunications network (PSTN) 20. This system includes all conventional cellular radio systems, cellular switching systems, trunks, satellites, and landline switching systems which are well known to those skilled in this art.

System 10 also includes a remote programming (RP) host 22, which couples to PSTN 20 through at least one, but preferably many, subscriber loops 24. RP host 22 is a computer system that remotely controls the programming of cellular subscriber station 12. Generally speaking, RP host 22 periodically engages in data communication sessions with cellular subscriber station 12. During such sessions RP host 22 and a cellular subscriber station 12 exchange data. Thus, data tables, timing data, predetermined telephone numbers, modes of operation flags, virtually any item of application data, and executable machine code utilized within cellular subscriber station 12 may be altered as a result of such sessions. Specific details of a preferred implementation of remote programming host 22 and its relation to remotely accessible cellular radiotelephones are provided in the above-listed related patent references.

Figure 2:
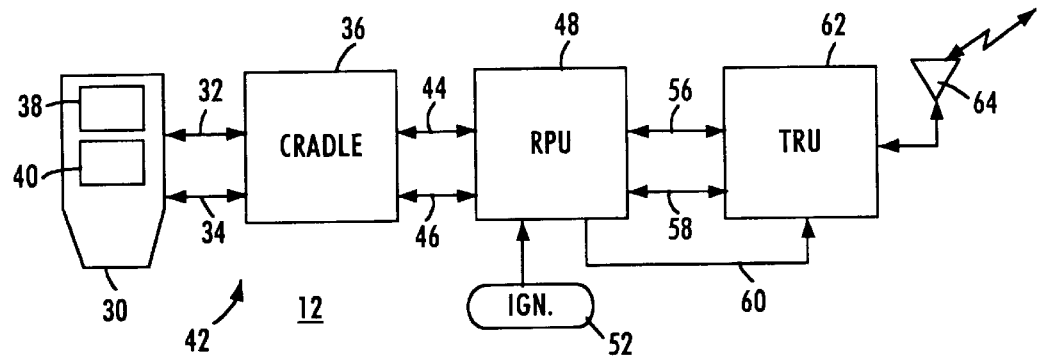
FIG. 2 is a block diagram of a cellular subscriber station that can be used in connection with the system of the present invention.

FIG. 2 is a block diagram of one example of a cellular subscriber station 12 that can be used with system 10. Cellular subscriber station 12 includes a handset 30 which is coupled through a first serial data bus 32 and a first audio bus 34 to a cradle 36. Handset 30 includes a display 38 and an array of keys 40. Together, handset 30 and cradle 36 are referred to as a control unit (CU) 42. CU 42 is a conventional control unit that performs functions which are well known in the art of cellular telephony.

A second serial data bus 44 and a second audio bus 46 interconnect cradle 36 with a remote programmable unit (RPU) 48. In addition, an ignition input 52 to RPU 48 couples to the ignition of an automobile (not shown) in which cellular subscriber station 12 is installed. RPU 48 regenerates serial and audio busses 44 and 46 as serial data and audio busses 56 and 58, respectively. In addition, RPU 48 has a simulated ignition output 60. Busses 56 and 58, and output 60 couple to a conventional transmit-receive unit (TRU) 62. As is standard, an antenna 64 through which TRU 62 communicates with antennae 18 (see FIG. 1) also couples to TRU 62. RPU 48 may represent a kit which is installed between a conventional CU 42 and a conventional TRU 62 of a conventional cellular subscriber station. The use of conventional cellular subscriber station equipment as a platform to which remote programmability hardware is added reduces costs due to the mass production of such conventional equipment. Preferably, RPU 48 is physically mounted on CU 42.

Figure 3:
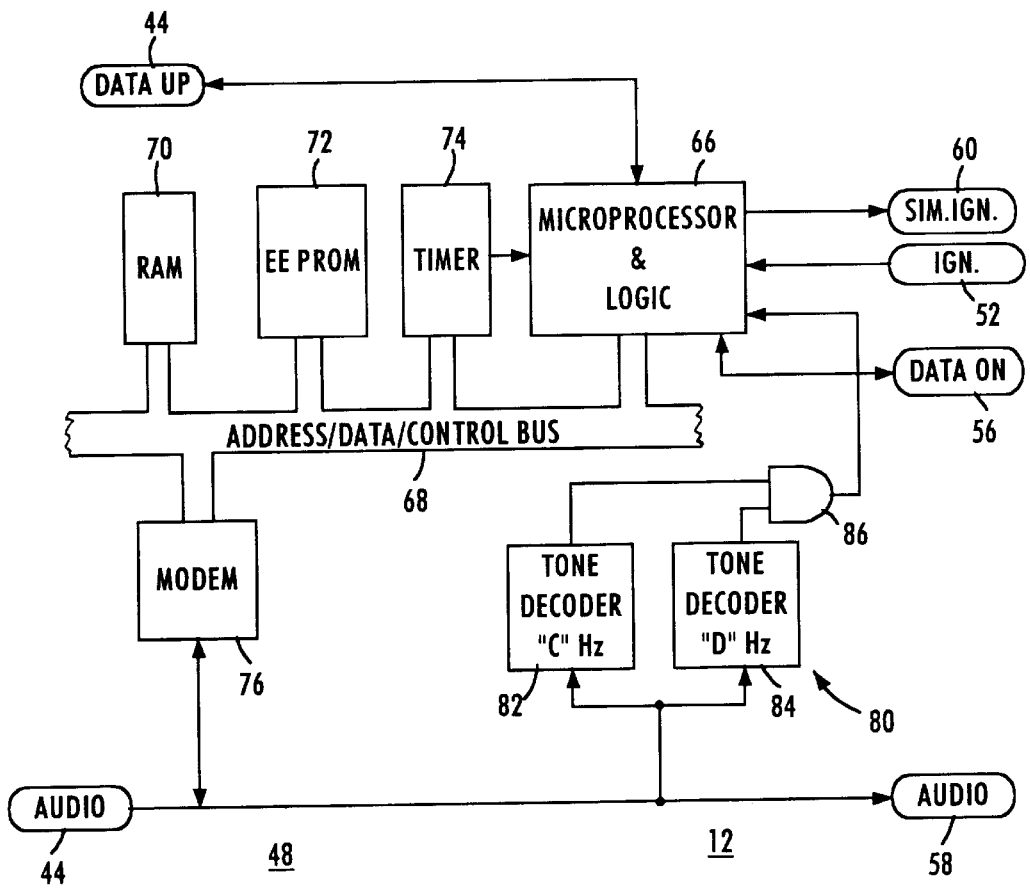
FIG. 3 is a block diagram of a remotely programmable unit (RPU) portion of the cellular subscriber station of the present invention.

FIG. 3 is a block diagram of typical hardware included in an RPU 48 such as that depicted in FIG. 2. As shown in FIG. 3, a microprocessor and logic section 66 is coupled to serial data bus 44 and to an internal address/data/control bus 68. Through bus 68, section 66 communicates with a random access memory (RAM) 70, a non-volatile, read-write memory 72, such as an electrically erasable PROM (EEPROM), a timer 74, and a data port of a modem 76. Those skilled in the art will understand that RAM 70 is one example of a volatile read-write type of memory, and battery-backed-up RAM and other memory devices may serve as non-volatile read-write memory 72. An audio port of modem 76 is additionally coupled to audio bus 58, and timer 74 preferably is coupled to an interrupt input of section 66.

Microprocessor and logic section 66 generally control the operation of RPU 48. In conjunction with timer 74, section 66 maintains a clock and calendar. Moreover, power is continually supplied to section 66, timer 74, and supporting sections of RPU 48 so that data describing the date and time remain current even when ignition to a vehicle in which cellular subscriber station 12 is installed is "off".

Modem 76 is a conventional modem circuit. Consequently, modem 76 recognizes audio signals on audio bus 58. Likewise, modem 76 supplies audio signals to audio bus 58. Modem 76 preferably operates at conventional data rates, such as 300, 1200, or 2400 bits per second, depending on control data supplied by microprocessor section 66. Communicated data and control data, such as carrier detection, are communicated to and from microprocessor section 66 through bus 68. On the other hand, ring detection is carried out by microprocessor section 66 monitoring data commands on serial data bus 56.

Section 66 senses the state of ignition signal 52. In addition, section 66 senses the state of an output from a signal detection circuit 80. Signal detection circuit 80 includes first and second tone decoders 82 and 84, respectively. Inputs of tone decoders 82 and 84 are coupled to audio bus 58, and outputs of tone decoders 82 and 84 are coupled to inputs of a logic element 86, which performs a logical AND function. The output of element 86 serves as the output of signal detection circuit 80 and is coupled to a sensing input of section 66.

Signal detection circuit 80 is configured to detect a predetermined log-in audio tone. In one embodiment, supporting the present invention, this log-in tone includes two predetermined frequencies, labeled as "C" and "D" in FIG. 3. Frequencies C and D are selected so that the log-in tone is as unique as possible within normal telecommunication. In other words, the log-in tone is unlikely to be present during normal telecommunication operations, other than in a log-in procedure.

As discussed above, CU 42 and TRU 62 (see FIG. 2) are provided by conventional nonremotely programmable cellular radiotelephone equipment. Specifically, in one embodiment supporting the present invention, a cellular telephone manufactured by the OKI corporation as model EM-23 serves as CU 42 and TRU 62. Microprocessor and logic section 66 of RPU 48 carry out this method by executing programmed instructions stored in memories 70–72. This method involves, at least in part, the processing of data to control the operation of system 10 (see FIG. 1). Some of the specific processing tasks performed by the preferred embodiment are directly related to the data messages and data formats dictated by the above-mentioned OKI model EM-23 cellular telephone. However, other conventional cellular telephones have similar or identical types of data messages and can be adapted by those skilled in the art for use in connection with the present invention.

Figure 4:
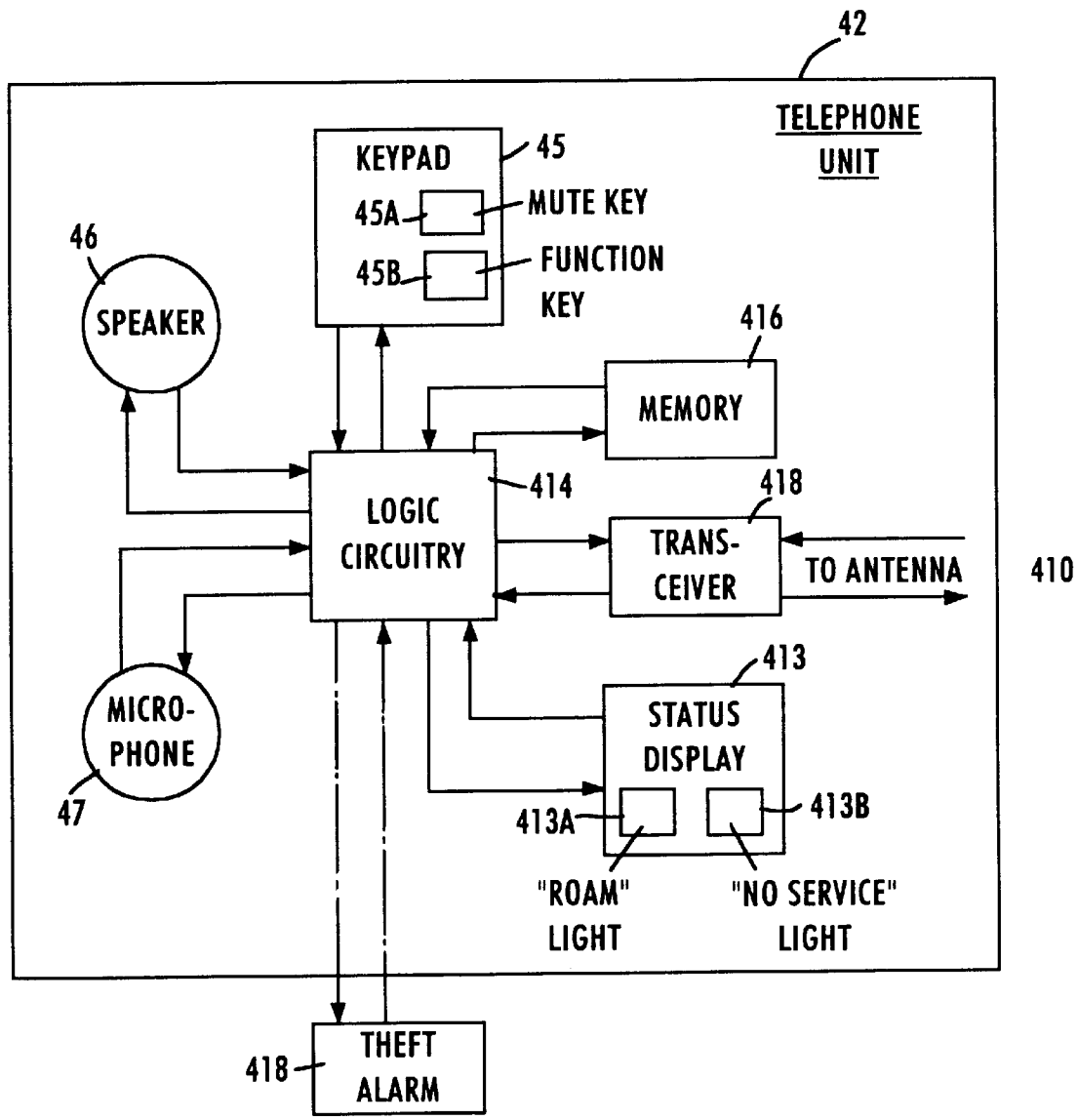
FIG. 4 depicts an alternative subscriber handset.

FIG. 4 depicts a typical automobile cellular telephone unit 42 having a unique mobile identification number (MID) stored in a suitable location such as an electrically erasable programmable read-only memory (EEPROM, not shown). Telephone units of this kind ar well known in the art and are described here only in sufficient detail to aid understanding the invention.

The telephone unit 42 includes a handset 44 having a keypad 45; equivalently, the keypad 45 could be located separately from the handset. Also included in the telephone unit 42 are a speaker 46 and a microphone 47, shown as being mounted within the handset 44 but either or both of which could equivalently be mounted apart from the handset, either separately (e.g., in a telephone operator's headset or in wall mountings), or approximately together (e.g., in a walkie-talkie or speakerphone configuration).

A transceiver 48, ordinarily built into the telephone unit 42, exchanges signals via an antenna 410) with a Mobile Telecommunications Switching Office (MTSO) typically via radiotelephone signals relayed by one of several cell sites 11 that are in turn connected with the MTSO via a landline. The MTSO is ordinarily connected with a telephone company switching unit via a high-capacity landline or similar connection.

A status display 413 shows the status of the telephone unit 42. The status display 413 typically includes a NO SVC indicator to show that no cellular telephone service is available; and a ROAM indicator to show that the telephone unit 42 is outside its usual service area.

The transceiver 48 and antenna 410 are shown as being separate from the handset 44, but either or both could be built into the handset.

Any of a wide variety of transmission systems that are equivalent for purposes of this description may be used. These include radio, electrical-type wire (such as telephone landlines), modulation of light beams (e.g., in fiberoptic networks or laser beams), and so forth. One or more of these media may be used, either alone or in combination. Whether specific components such as the antenna 410 are needed for a given implementation of the invention will depend in part on the transmission system selected for implementation.

The operation of the telephone unit 42 is controlled by logic circuitry 414. The logic circuitry 414 may be implemented in the form of a microprocessor which executes program statements stored in a storage device such as a read-only memory, or equivalently by discrete logic components or one or more custom semiconductor chips.

A sequence of numbers to be dialed by the telephone unit 42 is processed by the logic circuitry 414 generally as is done in the conventional art. Under control of the logic circuitry 414, the transceiver 48 transmits a cellular control signal to a cell site 411 over a signalling channel. The control signal includes a request that the MTSO dial a specified telephone number and assign a voice frequency or channel for use by the telephone unit 42.

Telephone unit 42 includes a read-write memory 416, accessible to the user and whose contents will not be affected by telephone power-downs of ordinary duration. For example, the memory 416 may equivalently comprise an EEPROM programmable by the user, a CMOS memory chip, or a conventional RAM with an independent power supply, any of which may possibly be implemented as part of a custom semiconductor chip.

Figure 5:
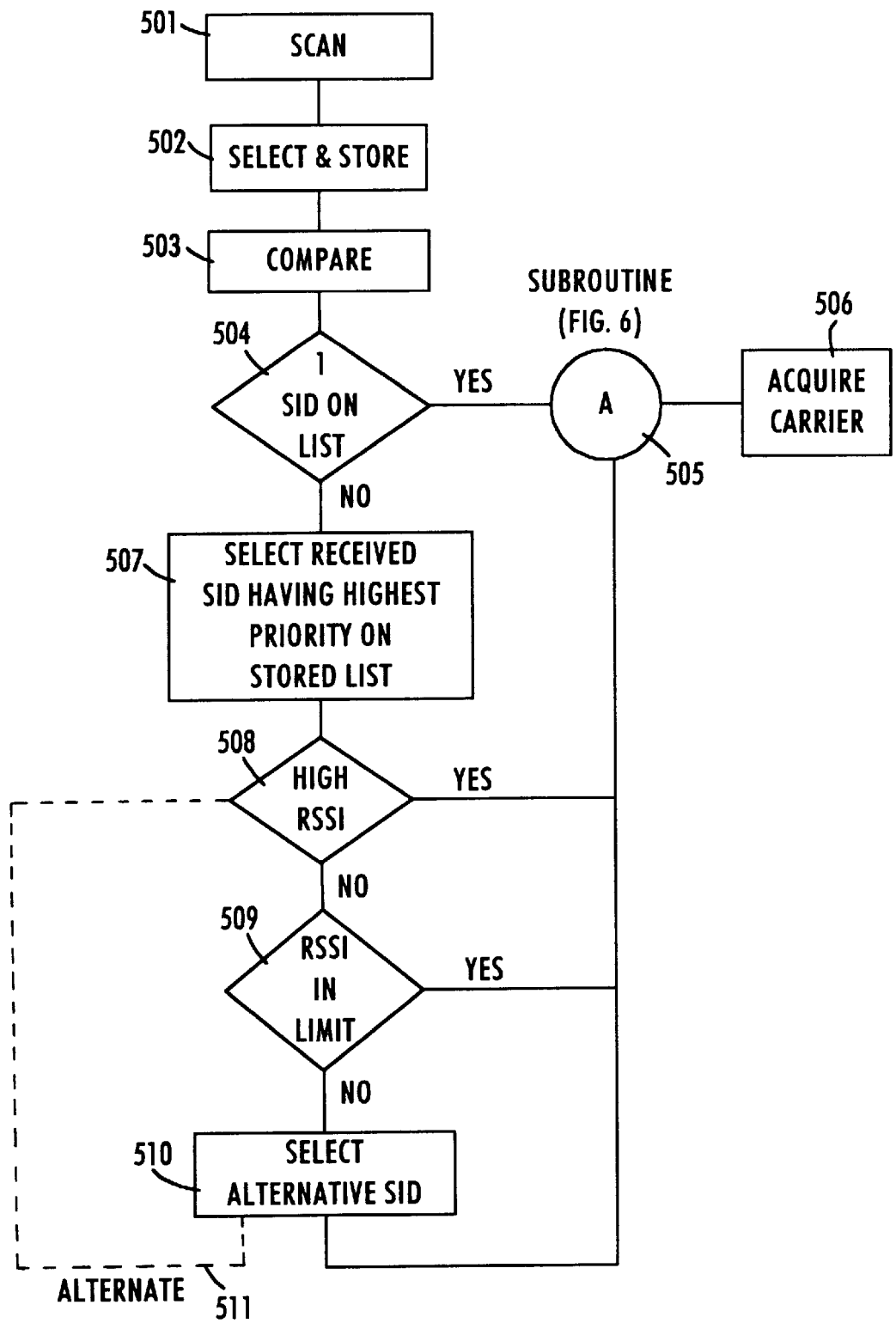
FIG. 5 is a flow diagram depicting the operation of selecting from among available SIDs.
Figure 6:
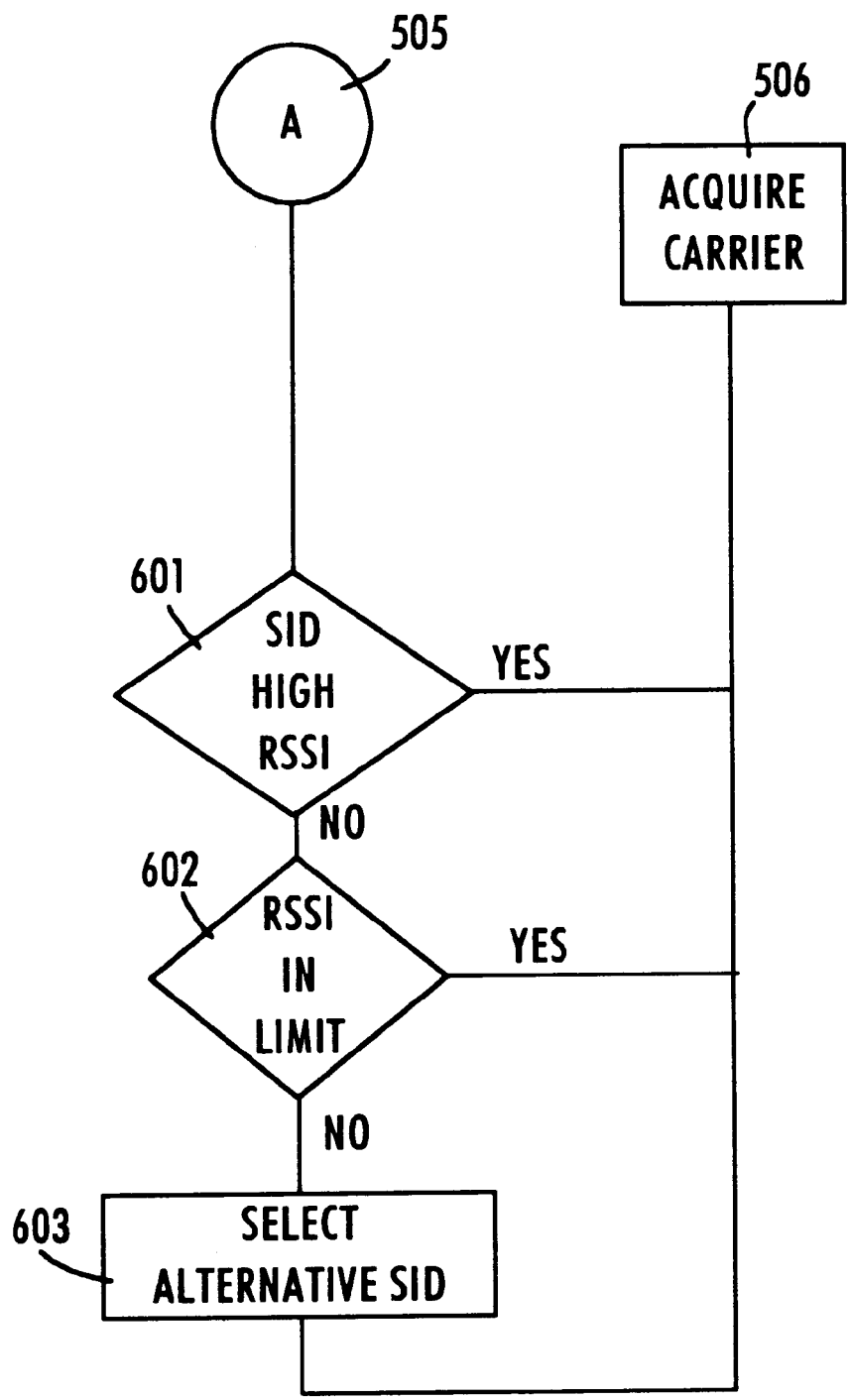
FIG. 6 is a flow diagram depicting a sub-routine included in the operation of the present invention.

The aforementioned modified handset used to carry out the present invention can be programmed to handle both registration and hand-off in accordance with the operation depicted in FIGS. 5 and 6, or can be arranged to accommodate variations which would occur to those skilled in this art. Other handsets such as those modified for CDPD operation, as described, infra, can be used in place of those depicted in FIGS. 3 and 4, which are used only as examples illustrating the functionality necessary to use the SID list that is the subject of the present invention. It is noted that FIGS. 5 and 6 depict one example of an optimal, comprehensive system that is preferably applied in the registration operation of a roaming subscriber station.

As previously stated, the SID list is part of the overhead message that is sent to the mobile subscriber station when it is powered up, and periodically thereafter. Normally when a cellular mobile subscriber station is powered up, it scans the wireless systems operating within its proximity, taking signal strength readings in the various available frequency bands (cellular A and B, and PCS). This step is depicted at 501 in FIG. 5.

At step 502, at least one SID for each of the bands, as well as the corresponding Received Signal Strength Indication (RSSI) is stored at the subscriber station. This function is preferably carried out in RAM 70 of FIG. 3 or in the logic circuitry 414 of FIG. 4. Normally only a single SID and its RSSI are recorded for each of the bands. However, on a third or C band that is normally dedicated to Personal Communication Systems (PCS), at least two SIDs and their RSSIs will be stored by the subscriber stations.

The present invention also encompasses the capability of selecting and storing more than one SID for each of the bands scanned. One example of such a situation is in areas at the interface between two carrier or service providers. Another example is found in hand-off situations. In both such situations, the two strongest signals for each of the scanned frequency bands will be selected and stored by the subscriber stations.

At step 503, the SIDs of the scanned signals having been selected and stored are compared with a list of SIDs for preferred system providers. Such system providers or carriers usually have a special contractual relationship with the carrier or service provider of the roaming subscriber so that the subscriber receives preferential treatment, normally in the form of lower usage rates. The list is normally preprogrammed into either a special memory such as EEPROM 72 (FIG. 3) or a microprocessor and logic circuitry 414 (FIG. 4). However, storage of the preferred SID list corresponding to preferred carrier or service providers can be carried out in any manner that would occur to those having skill in this art. The preferred SID list can also be modified or updated in any practical manner that would occur to one skilled in this art. The comparison operation is a simple logic operation meant to identify the received SIDs corresponding to those on the preferred SID list stored in the cellular subscriber station. This comparison can be as extensive as necessary depending upon the number of received SIDs and the full extent of the pre-stored preferred SID list.

At step 504, a determination is made as to whether one of the received SIDs is on the preferred SID list stored by the subscriber stations. If only a single received SID is found to be on the pre-stored preferred SID list, a determination of "YES" is made at step 504 and the process continues to point A at which sub-routine 505, as depicted in FIG. 6 can be carried out.

After sub-routine 505 is carried out, the subscriber station acquires a carrier frequency corresponding to the single received SID as depicted at step 506. Once the carrier (on a control frequency) is acquired, the subscriber station handset initiates registration with the system provider corresponding to the single SID resulting from the comparison of the received SIDs with a preferred SID list. It is noted that sub-routine 505 at point A is optional and can be used or deleted depending upon the constraints of the overall system as well as the priorities of the system operator.

There are other circumstances under which a plurality of positive comparisons will take place at step 503, resulting in a plurality of received SIDs from which a subscriber station must choose. There are a number ways of making this choice. In the conventional art, usually the first received SID found in the first positive comparison is selected as the carrier or service provider with which the subscriber station handset will register. This approach can be used with the present invention as long as each frequency band is scanned and at least one received SID from each band is stored in the cellular subscriber station.

The present system provides techniques that ensure greater chances of successful communication being carried out between the subscriber station and the selected carrier or service provider. One such technique is the assignment of priority within the pre-stored preferred SID list in the subscriber's station. Such priority could be based upon contractual considerations. However, this is not necessary. Rather, priority can be based upon RSSI or other system characteristics of the carrier or service provider that might further enhance the quality of communication between the subscriber station and the system provider, as well as enhance communication between parties in communication with the subscriber station via the carrier or service provider. One criteria for such prioritization can be the selection of a particular band such as the PCS bands under certain conditions. However, other characteristics of particular carrier or service providers can also be the basis of such prioritization, as long as the result is communication superior to that of other carrier or service providers accessible by the subject subscriber station. Whether the criterion for priority be contractual or characteristic of a communication system, one of the received SIDs is selected at step 507 to be that which is most preferred for registration with the subscriber station.

At step 508, the RSSI of the selected SID having the highest priority is compared to the RSSI of each of the received SIDs having a positive comparison with the pre-stored SID list in the subscriber station. If the selected SID has the highest RSSI of this group, the process moves to point A and the option of carrying out sub-routine 505. If the selected SID is unchanged by sub-routine 505, the control frequency corresponding to a carrier or service provider having the selected SID is acquired by the subscriber station and registration carried out with that system provider.

If the selected SID does not have a highest RSSI of the received SIDs having a positive comparison with the pre-stored preferred SID list, a biasing process is conducted at step 509. The biasing process is used to favor a selected SID having a higher priority but a lower RSSI (or other signal characteristics) than other received SIDs found on the preferred SID list. One technique is indicated at step 509 and is constituted by a determination that the selected SID is within a predetermined tolerance "window". This "window" is based upon a predetermined difference between the RSSI of the selected SID and the highest RSSI of any received SID found on the priority list. Since the whole purpose of this comparison is to bias the system in favor of staying with a higher priority SID based on the preferred SID list, the size of the "window" or of any other threshold can be determined by well-known statistical techniques.

However, such techniques are not necessary. A system operator could simply assign some arbitrary value based upon his or her own judgment reflecting a trade off between signal strength (call quality) and predetermined priority for selected system providers. If the RSSI of the selected SID is within the predetermined limits at step 509, the process moves to point A for the option to undergo sub-routine 505 as illustrated in FIG. 6. As previously stated, this sub-routine can be bypassed at the discretion of the system operator. If the selected SID remains unchanged after point A, carrier acquisition of a control frequency for the selected SID is conducted at step 506 as previously described.

If the RSSI of the selected SID is not within the predetermined limits used at step 509, the process moves to step 510 for the selection of an alternate SID. As indicated in FIG. 5, the alternate SID is selected and the routine moves to point A, and from there to the acquisition of an appropriate carrier frequency. The selection of the alternate SID can be based upon the received SID on the preferred SID list having the highest RSSI. An alternate routine is also possible as indicated by alternate 511 on FIG. 5. In this step, the alternate SID is based upon a level of priority of a received SID as determined by the priority of the SIDs on the preferred list stored in the cellular subscriber station. Taking this alternative, a determination is made at step 508 if the new (alternate) SID has the highest RSSI (of all received SIDs found in the preferred SID list). The process of steps 508, 509 and 510 is repeated as before.

FIG. 6 is a flow chart depicting an optional sub-routine that can be carried out at point A of the FIG. 5 flow chart. Instead of carrying out the sub-routine, the SID selected in the flow chart of FIG. 5 can be the SID with which the roaming subscriber station registers by acquiring a control carrier at step 506. However, there may be circumstances under which there is a wide disparity between the RSSI of received SIDs found on the preferred SID list and the RSSI of received SIDs not found on the preferred list. Consequently, some balancing must be done between the desire to use a preferred carrier or service provider and the necessity of ensuring high quality communication. This balancing has already been partially addressed by some of the steps in the flow diagram of FIG. 5. However, this is limited to a comparison of the RSSI of those received SIDs found on the preferred SID list. Other received SIDs may have much higher signal strength readings, making them better candidates for completion of a call even though the available rates are not as low as those from carrier or service providers on the preferred SID list.

At step 601, the RSSI of the selected SID is compared with that of all the other received SIDs to determine if the RSSI of the selected SID is the highest. If this is the case, then the control carrier of the carrier or service provider associated with the selected SID is acquired by the subscriber station and registration carried out. If, on the other hand, the selected SID does not have the highest RSSI of all of the received SIDs available to the subscriber terminal, a comparison will be made at step 602 between the RSSI of the selected SID and that of the available SID having the highest RSSI value. This step can be conducted in the same manner as done at step 509 in FIG. 5. The selection of a "window" or a "threshold" depends upon the system operator's balancing of the desire for a higher priority carrier or service provider and the need for the highest quality communication. If the selected SID is within the tolerance ranges dictated for the step at 602, then the control frequency carrier of the system provider corresponding to the selected SID is acquired by the subscriber station and registration carried out.

If, on the other hand, the RSSI of the selected SID is not within the limits set at step 602, an alternate SID must be selected as indicated at step 603. Based upon the process carried out in FIG. 5, the selected SID is assumed to be that having the highest RSSI of all of the received SIDs on the preferred SID list stored in the subscriber station. Consequently, the only alternatives available for superior call quality will be received SIDs not found on the preferred SID list stored in the subscriber station. Since there is no priority among the received SIDs not on the preferred SID list, the SID having the highest RSSI will be selected to ensure the highest call quality. Consequently, at this point, the selection of an alternate SID will be limited to a single choice.

It is noted that with the proper selection based upon criteria applied at step 502 in FIG. 5, steps 509 and the entire sub-routine of FIG. 6 can be eliminated. This would require that only those signals that have a sufficiently high RSSI for high quality communication will be considered, thereby obviating additional checks of RSSI for a selected SID. It is further noted that the use of steps 509 and 602 for additional RSSI comparison is necessitated only when there are a plurality of acceptable SIDs found on each of the frequency bands. Normally this is not the case in the "A" and "B" bands.

The "C" band which is expected to be dedicated to PCS use, on the other hand, will provide a plurality of SIDs so that at least two SIDs will be selected and stored (at step 502) for the PCS band. It is further noted that there may be more than one PCS band, and each of these bands will provide at least two SIDs to be selected and stored at step 502. As previously stated, if the threshold parameters at step 502 are set high enough, even the PCS bands will normally not provide more than one candidate SID for selection and storage. Such threshold parameters are adjustable based upon the traffic, band allocation and other parameters known to the system operators and designers. The thresholds throughout the entire process depicted in FIGS. 5 and 6 are variable, and as previously stated, can actually be used to eliminate some of the steps as being redundant. The key to the operation of the present invention is the use of at least one signal from each of the bands for selection and storage, and later comparison to the preferred SID list.

While registration of a roaming subscriber station is normally limited to the selection and storing of a single SID from each of the available bands during registration (except at the boundary between carrier or service providers), this is not the case for hand-off occurring at the boundary between cell site base stations. Because of this interface, there will be more than one strong signal on each of the bands. Consequently, it is necessary for the system to select and store the two strongest signals from each of the available bands.

The process depicted in flow charts of FIGS. 5 and 6 can be used to bias hand-off from a preferred carrier or service provider to a non-preferred carrier or service provider. Such biasing would take place at step 506 (FIG. 5). This biasing would inhibit hand-off from a weakening preferred carrier or service provider to a non-preferred carrier or service provider having a much stronger signal. As previously stated, the ratio between the two signals could be the key factor for determining when the delayed hand-off should finally take place. Thus, a modified version of FIG. 5 could be employed as part of the overall hand-off sequence. The SIDs available for hand-off would be selected and stored. The received SIDs would be compared to the stored preferred SID list to determine if a preferred SID was available for hand-off. A preferred SID could be selected based upon signal strength or priority of the stored SID list. A final comparison of the RSSI of the selected SID could be made to that of the strongest available SID. In this step, the biasing factor could be applied balancing the desire to use a preferred SID against the necessity for high quality signal characteristics. Based upon this last evaluation, either the selected preferred SID can be used as a hand-off target, or the strongest non-preferred SID can be used. In the latter case, hand-off from a preferred SID to a non-preferred SID can be delayed based upon differences in signal strength or any other factor that could be derived through normal statistical analysis. Such a statistical analysis is not necessary since the factor could be based solely on the judgment of the system operator.

It is significant to note that the aforementioned technique can be used to accommodate virtually any contractual arrangement between carrier or service providers, encompassing a wide range of system provider status and priority. These priorities can be balanced against measured signal parameters based upon virtually any criteria selected by the system operator. The purpose of any biasing done in this balancing between the two factors is done with the purpose of maintaining acceptable communication quality while keeping the price to the subscriber as low as possible.

It is noted that the operation of selecting the most appropriate available carrier or service provider based upon the pre-stored preferred SID list can be manually negated. This is most easily done through keypad 45 (FIG. 4). However, the manual override control is not limited to the depicted keypad. Rather, any control device occurring to one skilled in this art can be used with a handset modified in accordance with the present invention.

Because contractual relationships between system providers change, changes in the preferred SID list stored in the subscriber stations will be necessitated from time to time. As previously described, updates of the preferred SID list can be entered manually using the keyboard on the subscriber station handset. However, this process requires instructions from the carrier or service provider as well as a concerted effort on the part of the subscriber to make the necessary changes. Further, a subscriber does not normally know when to contact the carrier or service provider to receive updates in a timely fashion. It is also noted that a system provider may wish to download data in addition to that contained in the preferred SID list to individual s. Consequently, manual downloading of the preferred SID list and any accompanying data is usually inappropriate.

To better serve the subscriber, the updated preferred SID list should be automatically downloaded from the carrier or service provider to the subscriber station handset as soon as the changes to the SID list have gone into effect. Further, for the convenience of the subscriber, the downloading operation is best conducted in a transparent manner, that is, the subscriber is unaware when the operation is being carried out. The only indication that need be made to a subscriber is a display of the most recent version of the updated preferred SID list, provided when a manual request is entered by the subscriber using the handset keyboard.

In order to carry out the aforementioned service for the subscriber, it is necessary to establish a wireless bidirectional communication path between the subscriber station and a remote control center. The subscriber station is activated when it is to receive the updated preferred SID list, as well as other data, over the communication path. This path can be constituted by both wireless and landline links, depending upon the characteristics of the carrier or service provider. The subscriber station can be selectively activated by the carrier or service provider communication system, or can receive the updated preferred SID list by way of a general broadcast. Authorization for carrying out this communication can be initiated within the communication system of the carrier or service provider, or can be initiated by the subscriber through the subscriber station handset. In either case, identification (of the subscriber station) is necessary to carry out a "handshake" process, assuring that the proper subscriber station is receiving the proper information from the carrier or service provider communication system. One method for placing the subscriber station in the program mode (to record the updated preferred SID list) is receipt of the predetermined sequence of tone signals using a Dual Tone Multi-Frequency (DTMF) receiver in the subscriber station handset.

Figure 7:
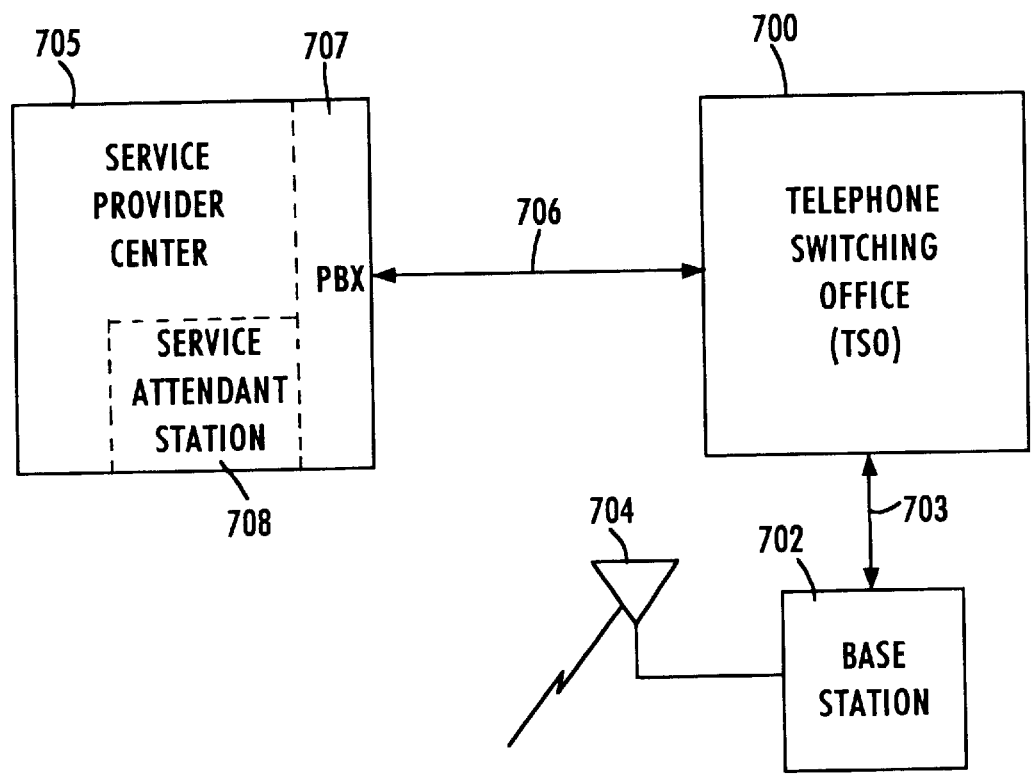
FIG. 7 is a block diagram of a comprehensive system for providing control data to a mobile radio telephone subscriber station.
Figure 7:
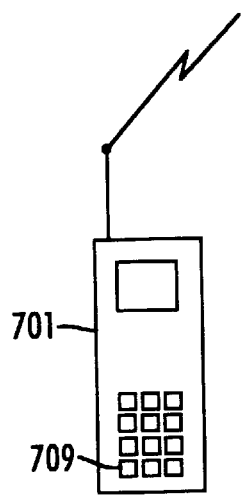

FIG. 7 is a schematic representation of a wireless communication configuration which illustratively includes a telephone switching office (TSO) 700 which is adapted to link a wireless telephone set or subscriber station 701 into a regional or nationwide telephone network (not shown). A base station 702, coupled to the TSO 700, via a bidirectional communication link 703, is arranged to be in radio frequency communications with the wireless telephone set 701 via a radio frequency antenna 704. Also shown in schematic form, is a communications carrier or service provider center 705 adapted to be coupled to the TSO 700 via another bidirectional link 706. The carrier or service provider center 705 includes a telephone private branch exchange (PBX) 707, and a service attendant station 708 coupled to the PBX 707. The wireless telephone set 701 may include any of a fixed wireless telephone station, a mobile/cellular telephone set, or a cordless-type telephone set.

Normally a mobile wireless telephone set or subscriber station, such as that disclosed herein, may not initiate and complete radiotelephone calls until it is registered with and authorized for service by a carrier or service provider. All regular radiotelephone communication channels are blocked to unauthorized callers who are not registered and authorized for service. Virtually all carrier or service providers however do provide continuously unblocked service channels for permitting mobile wireless telephone sets to communicate with the service center without having prior registration and authorization. This is typically a 611 number and may be accessed by any handset whether it is presently authorized or not.

Upon the purchase or lease of the wireless cellular telephone set 701 (in FIG. 7), a prospective subscriber would be assigned by the vendor or lessor a valid wireless (cellular) telephone number which typically would include an area or regional code number followed by a station number. In order for the subscriber to be able to use the wireless cellular telephone set 701, a telephone carrier or service provider or reseller, of the subscriber's choice, must authorize such use by programming the set 701 so that it is identifiable within the wireless telephone network as an authorized and legitimate wireless service subscriber/user.

One method of programming cellular subscriber station 701 is achieved by having the subscriber dial, out of the set 701, a predetermined service center number to first establish a communication path 700 over the unblocked service channel with the carrier or service provider center 705 via the radio antenna 704 and base station 702, the bidirectional link 703, the TSO 700 and the other bidirectional link 706. Once the communication path is established between the telephone set 701 and the carrier or service provider center 705, the subscriber/user can verbally, or by means of the telephone set dial, convey to an operator at the service attendant station 708 any requested subscriber-specific information. In accordance with an illustrative embodiment, the telephone set 701 is equipped with a program activating key 709 adapted to bridge an audio signal receiver (not shown), which is located within the telephone set 701, onto the then currently established communication path with the service center 705. In turn, the operator at the attendant station 708 would bridge an audio signal transmitter located at the center onto the communication path. The foregoing in effect couples the transmitter at the center 705 with the telephone set signal receiver so that the service operator can remotely enter information directly into the set 701.

As mentioned above, the information intended to be entered and stored in the telephone set 701 is specific to the subscriber owner or lessee. In the case of cellular mobile communication services, such information is referred to as Number Assignment Module (NAM) designation parameters. A sample of such NAM designations that can be remotely downloaded into the telephone set 701 are listed in the following table:

| | |
|---|---|
| System Identification | 00022 |
| Telephone Number | 2013866366 |
| Access Overload Class | 06 |
| Group Identification | 10 |
| Initial Paging Channel | 0334 |
| Security Lock Code | 6366 |
| Local Use Flag | 1 |
| A/B System Selection | 1 |
| Min Mark Flag | 1 |

The service operator at the station 708 can either use a telephone keypad as means for generating and transmitting the above NAM designation parameters, or alternatively can enter the above-listed information into a data terminal, e.g. a computer, that is coupled to a signal transmitter, e.g. a DTMF generator. In the above example, a total number of NAM characters to be transmitted includes 30 digits, with each digit having a value of 0 through 9. With the addition of an initial character to denote the beginning of transmission (e.g. "*"), an ending character to indicate the end of transmission (e.g. "#"), and, for example, a three-digit cyclic redundancy check (CRC) coding segment, the information is transmitted as follows:

*00022201386636606100334636611l#BBB wherein BBB is a CRC 8 checksum byte. Once the above information is received, detected and stored in the telephone set 701, the latter is switched back into normal (i.e., voice) telephone service operation at which point the subscriber user is informed by the service operator that the telephone set 701 is fully programmed and ready for use.

Figure 8:
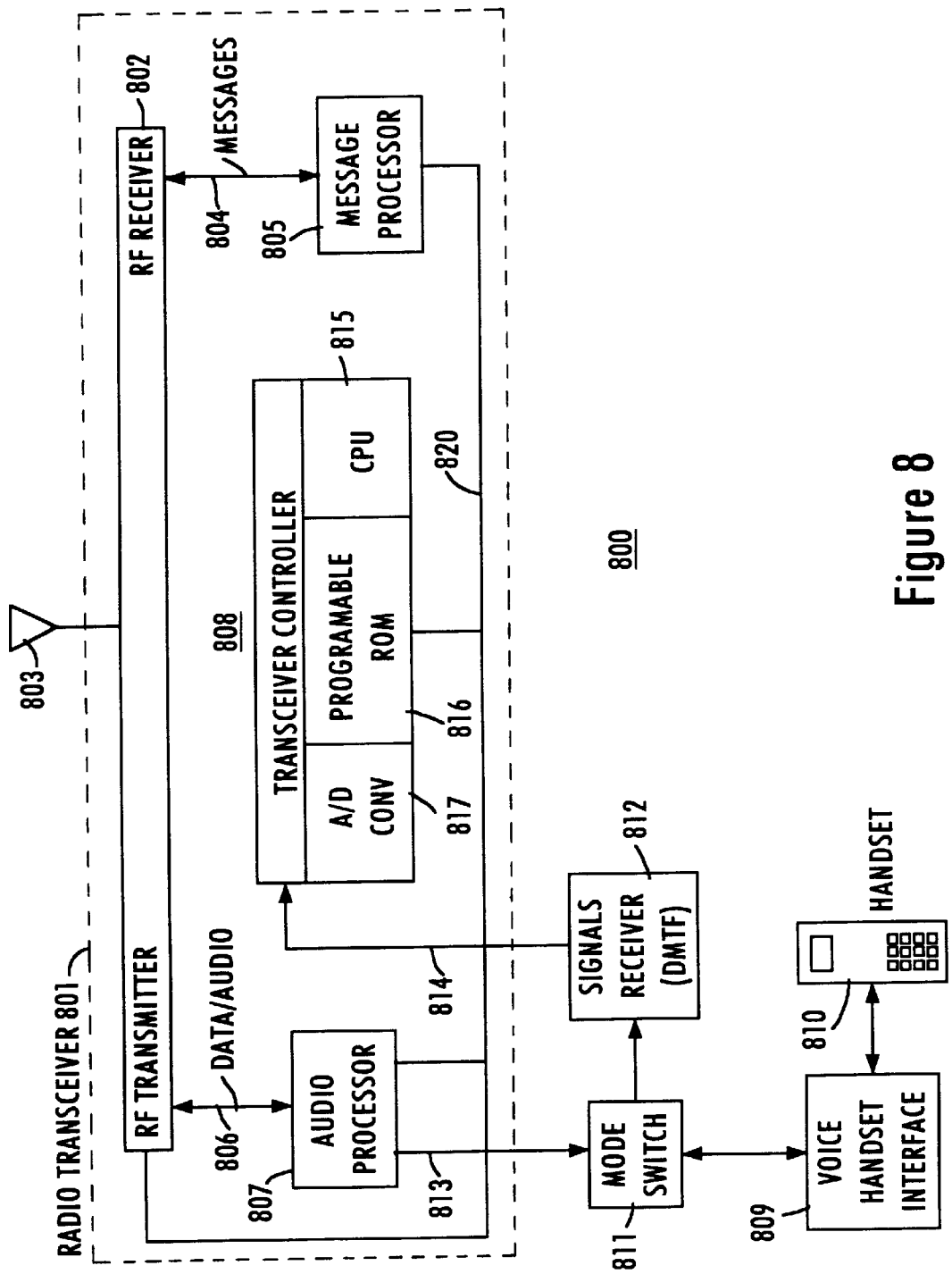
FIG. 8 is a block diagram depicting another example of a radio telephone subscriber station capable of carrying out the present invention.

Another example of a subscriber station handset configured to carry out the downloading operation of the present invention is depicted in FIG. 8. The cellular subscriber station includes a radio transceiver portion 801 which includes a radio frequency receiver/transmitter 802 coupled to an antenna 803 and adapted to receive and transmit signals from and to a base station, e.g. a mobile cell site, or another wireless telephone. Coupled to the receiver/transmitter 802, via a bidirectional message connecting lead 804, is a processor 805 capable of receiving and processing system message-type signals. Also coupled to the receiver/transmitter 802, via another bidirectional lead 806, is a processor 807 adapted to process data signals as well as audio signals originating or received at the wireless telephone 800. Audio and data signals present on lead 806 are those signals intended for and derived from the antenna 803.

Within the radio transceiver 801, a controller 808 is coupled to the message processor 805 and the audio processor 807, via a control bus 820, which is also coupled to the receiver/transmitter 802. A voice handset interface circuit 809 interconnects the audio processor 807 and a telephone handset 810. In accordance with one illustrative embodiment, interposed between the voice handset interface 809 and the radio transceiver 801 is a mode switch 811, which in turn is coupled to a signals receiver 812. The latter is coupled via lead 814, to the transceiver controller 808. During the remote programming, or NAM designation parameters downloading, of the subscriber station telephone set 800, the mode switch 811 diverts signals received at the antenna 803 and present on output lead 813 of the audio processor 807 to the signals receiver 812. The signals receiver 812 may be selected among known commercially available receivers, such as, for example, the Hitachi HD404678 4-bit microprocessor with an integral DTMF receiver. In the case where the programming signals out of the audio processor 807 and present on lead 813 are in digital form, the signals receiver 812 couples such digital signals to the controller 808 wherein an internal controller processing unit 815 directs such digital information for storage in a memory circuit within the controller 808, such as, for example, permanent read-only memory 816. Alternatively, if the programming information received at the antenna 803 is in the form of a sequence of tone signals, the receiver 812 (which in such case would be a tone signals receiver) would connect such signals to an analog-to-digital converter 817 located within the controller 808. The digital output signals generated by the converter 817 would next be stored in the memory circuit 816 under the control of the processing unit 815.

Figure 9:
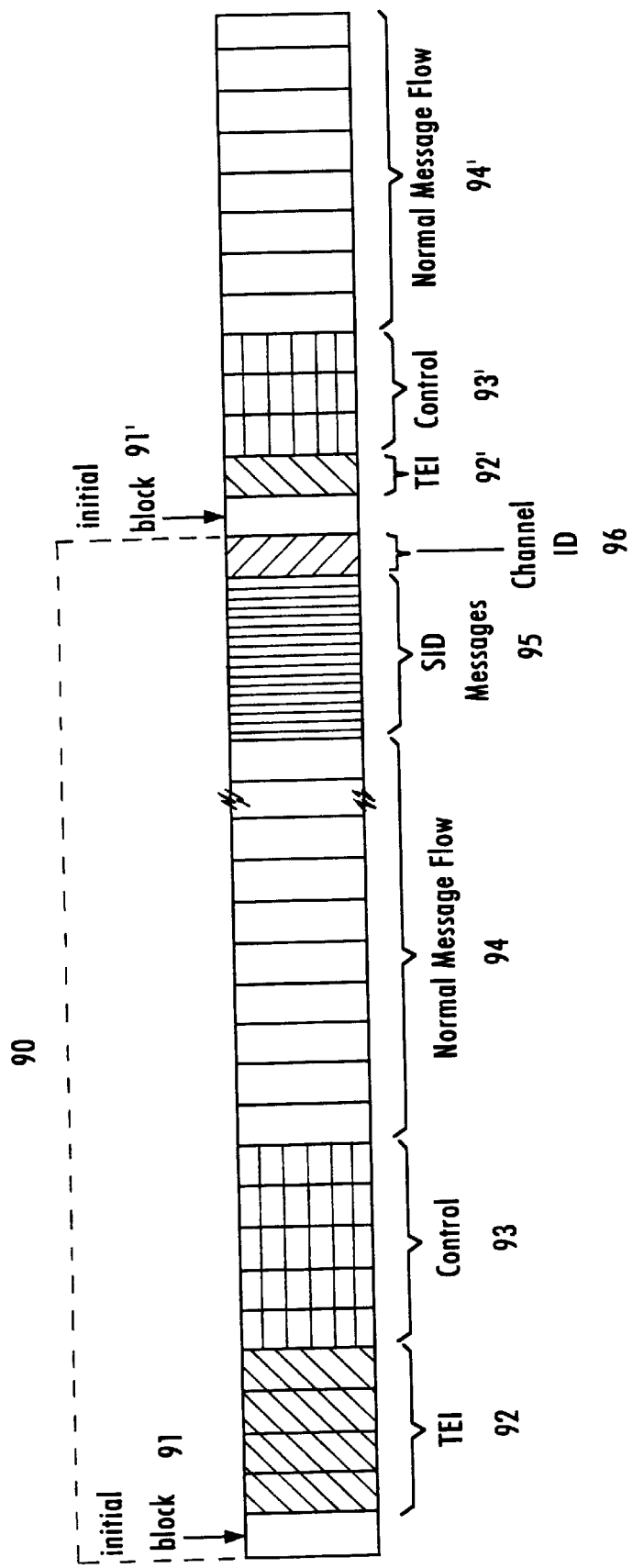
FIG. 9 is a diagram depicting a cellular digital packet data (CDPD) blocks.

This could be accomplished by inserting a character into the normal CDPD message flow, as depicted in FIG. 9, infra. Such a character would be indicative of the current version of the preferred SID list. The cellular subscriber station to compare this version of the SID list with the current version stored within the subscriber stations. If the two versions are identical, the subscriber station need take no further action. However, if the versions do not match, this difference is indicative that a scan of the updated preferred SID list must be made.

Generally, the download of the updated preferred SID list is conducted within the geographic region served by the carrier or service provider. While it is possible to update the SID list of a roaming subscriber, this operation requires additional manipulations resulting in a more complex operation. Downloading within the geographic area served by the carrier or service provider is also preferable since the carrier or service provider may customize the operation of local control. If a subscriber uses a Group ID Mark (GIM) of ten, the subscriber station's handset will only recognize local commands at the least significant ten bits of the received SID matches the least significant ten bits of the pre-programmed SID stored in the handset. This implies that local control will typically work only for home mobile subscribers, or those which meet the above-mentioned criteria for roamers.

In one embodiment, the latest version number of the preferred SID list is broadcast to any mobile subscriber station in range of the base station making the broadcast. It is noted that the base station broadcasts are controlled by a mobile telephone switching office 700 (in FIG. 7). However, the present invention is not limited to this technique. In an alternate embodiment, each of the mobile subscriber stations in a geographic area controlled by a MTSO is individually addressed to receive the most recent version of the preferred SID list. The MTSO keeps tracks of each of the subscriber stations within its geographic area, and thus, can keep track of each subscriber station that has been provided with the most recent version of the preferred SID list. While a record can be kept in either the MTSO or each of the base stations of each of the subscriber stations within the system having the latest version of the preferred SID list, this is not necessary. Rather, in the alternative, each of the base stations can automatically continue to update each of the subscriber stations within its geographic area. The subscriber stations can be addressed sequentially using the TEI blocks depicted in FIG. 9 for the download, and the sequential address repeated once the entire list of subscriber stations has been addressed. Records of subscriber stations with updated preferred SID lists need not be kept.

A base station may send simultaneous instructions to a plurality of different mobile subscriber stations, directing them to tune to separate (or the same) voice or traffic channels to receive the download of the most recent version of the preferred SID list, as well as other data considered appropriate. As a result, mobile subscriber stations not designated will not receive the updated preferred SID list download. Because only those subscriber stations designated are directed to tune to the designated voice channel, a general broadcast of the updated preferred SID list, as well as other relevant data, can be made on the assigned voice channel. This simplifies the downloading of the preferred SID list since a download can take place periodically and the system control mechanism does not have to keep track of the preferred SID list status of each of the mobile subscriber stations in the geographic area of the communication system.

In one arrangement, the preferred SID list download is carried out from an Intelligent Peripheral (IP). The IP can be an adjunct processor attached to a telephone switching office or MTSO 700 (depicted in FIG. 7). The IP will keep track of the latest versions of the SID list as well as other relevant data that may be downloaded with the SID list. The IP can be part of the carrier or service provider center 705 or used in any part of an Advanced Intelligent Network (AIN) with which the carrier or service provider is associated. Consequently, if the mobile telephone switching office 700 is serviced by an SSP type switch, as part of a landline network associated with the mobile telephone system, the IP can be associated with that SSP switch. A disclosure of an AIN is found in U.S. Pat. No. 5,247,571 to Kay et al. (commonly assigned and incorporated herein by reference). Further, the description of IPs and their use are found in U.S. patent application Ser. No. 08/248,980 (incorporated herein by reference).

The time and circumstances during which preferred SID list download may take place is not limited to that previously described. Rather, it is possible to download a SID list when incoming communication is being established with a subscriber station handset. The downloading of the preferred SID list can take place between rings of an incoming call to a mobile subscriber station, or before the subscriber at the mobile unit answers the incoming call. Downloading under such circumstances would establish beyond any doubt the identity of the mobile subscriber station being provided with the updated preferred SID list. Extending this concept one step further, it is possible to perform the downloading of the updated preferred SID list in virtually any space found on the voice channels between voice communication traffic using cellular digital packet data (CDPD) communication as described with respect to FIG. 9.

CDPD Operation

The efficient wireless communication of both voice and data signals in an integrated package has been accomplished in part through the use of cellular digital packet data (CDPD) systems as specified in the CDPD specification, Version 1.1 previously incorporated herein by reference. Normally, the CDPD communication system shows the same carrier frequencies assigned to the analog voice channels as described in Part 405 of the CDPD specification.

Figure 10:
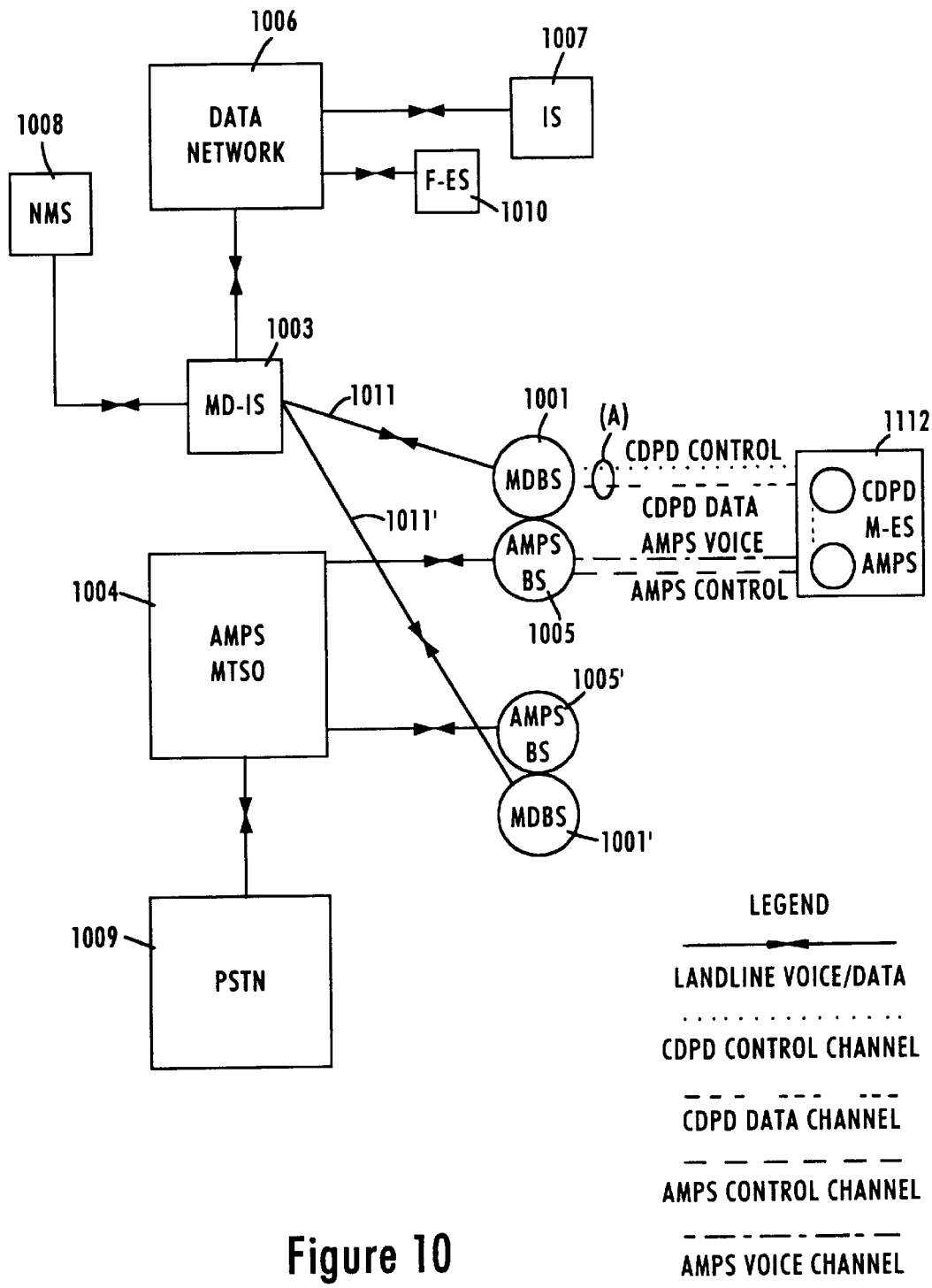
FIG. 10 is a block diagram depicting the relationship between an analog cellular voice communication system and a CDPD communication system.

The typical base unit or mobile data base station (MDBS 1001, as illustrated in FIG. 10) of a CDPD system utilizes a channel within an AMPS cell to establish a link and communicate to a user's wireless subscriber station. The MDBS may use other frequencies outside of AMPS that are made available to it by carrier or service providers. The wireless subscriber station (M-ES 1002) is a portable computer, handset or other portable electronic device containing a subscriber communication station. The MDBS serves as a communications link between the user of the wireless subscriber station M-ES 1002 and a carrier or service provider's network of wire lines, microwave links, satellite links, AMPS cellular links, or other CDPD links (such as mobile data intermediate system MD-IS 1003 and other intermediate systems 1006) to convey data to another wireless subscriber station, computer network, or non-mobile or a fixed end-user system (F-ES 1010).

The CDPD network is designed to operate as an extension of existing communication networks, such as AMPS networks and the Internet network. From the mobile subscriber's perspective, the CDPD network is simply a wireless mobile extension of traditional networks. The CDPD network shares the transmission facilities of existing AMPS networks and provides a non-intrusive, packet-switched data service that does not impact AMPS service. In effect, the CDPD network is entirely transparent to the AMPS network, which is "unaware" of the CDPD function.

The CDPD system employs connectionless network services (CLNS) in which the network routes each data packet individually based on the destination address carried in the packet and knowledge of current network topology. The packetized nature of the data transmissions from an M-ES 1002 allows many CDPD users to share a common channel, accessing the channel only when they have data to send and otherwise leaving it available to other CDPD users. The multiple access nature of the system makes it possible to provide substantial CDPD coverage to many users simultaneously with the installation of only one CDPD station in a given sector (transmitting range and area of a standard AMPS base station transceiver).

The airlink interface portion of the CDPD network consists of a set of cells. A cell is defined by the geographical boundaries within the RF transmission range from a fixed transmission site such as MDBS 1001, which can be received at acceptable levels of signal strength by mobile subscribers such as M-ES 1002. The transmitter supporting the cell may be located centrally within the cell, with transmission being carried out via an omni-directional antenna, or the transmitter located at the edge of a cell and transmitted via a directional antenna to cover only a portion of the cell, referred to as a sector. In typical configurations, the transmitters for several sectors are co-located. The area served by a set of cells has some area overlap so that a roaming wireless subscriber station can maintain continuous service by switching from one cell to an adjacent cell in a manner roughly analogous to the standard hand-off in an AMPS system. The two cells are considered to be adjacent if an M-ES 1002 can maintain continuous service by switching from one cell to the other. This switching process, called cell transfer, is done independently of normal AMPS hand-off procedures.

In FIG. 10, the interface (A) between the wireless subscriber station 1002 and the MDBS 1001 is an "air interface" constituted by a radio frequency link using standard AMPS frequencies. The interface (A) is shown as both CDPD control channel and a CDPD data channel. However, the functions of both channels can be carried out on a single CDPD channel. In most cases, the use of a single channel greatly simplifies CDPD operation, thereby providing one of its chief benefits. The MDBS 1001 is connected to other mobile data base stations through a mobile data intermediate system (MD-IS) 1003. A number of mobile data base stations can be under the control of a single mobile data intermediate system. The mobile data intermediate systems are connected to each other through intermediate systems such as 1006, 1007 in FIG. 10.

An intermediate system is constituted by at least one node connected to more than one sub-network (such as intermediate system MD-IS 1003). The intermediate system has a primary role of forwarding data from one sub-network to another. The mobile data intermediate system MD-IS 1003 performs data packet routing based on knowledge of the current location of each wireless subscriber station within the range of the mobile data base stations under the control of the MD-IS. The MD-IS is the only network entity that is "aware" of the location of any of the wireless subscriber stations. However, under some circumstances (as defined by the CDPD specification, Version 1.1), particular mobile data base stations will keep track of behavior of specific wireless subscriber stations. A CDPD-specific Mobile Network Location Protocol (MNLP) is operated between each MD-IS (through the intermediate system) to exchange location information regarding the wireless subscriber stations.

The overall CDPD network is controlled by a network management system (NMS) 1008 having an interface with at least one mobile data intermediate system 1003. Using a special protocol, programming instructions can be transmitted from the NMS 1008 through the MD-IS 1003 to any number of mobile data base stations under proper conditions.

Such programming instructions can be used to convey useful network data to the MDBS 1001, as well as configure the operation of an MDBS with respect to such critical features as maintaining channel queues. The NMS 1008 also controls other CDPD system characteristics such as the timing of paging messages to coincide with non-dormant periods of the M-ES 1002 handsets. One advantage of CDPD is the capability of providing operating instructions to mobile data base stations from the NMS through an MD-IS 1003, or by a direct connection to the MDBS 1001 as outlined in the description of MDBS architecture found in the CDPD specification, Version 1.1, Parts 402 and 403.

FIG. 10 also depicts a comparison between the CDPD network and a standard analog cellular voice network such as AMPS. The MDBS 1001 is the CDPD equivalent of an AMPS base station 1005. Both serve as links to mobile users 1002. Both AMPS and CDPD functions can be handled by the same subscriber handset or end system equipment (M-ES 1002). Also, the MDBS 1001 is preferably co-located with the AMPS base station 1004.

The MD-IS 1003, which acts as a local controller for the CDPD mobile data base stations connected to it, is generally equivalent to the mobile telephone switch office (MTSO) 1004 used to control a plurality of AMPS base stations 1005, 1005'. In the AMPS system, the MTSO 1004 can be connected to the various base stations 1005, 1005' by way of communication links, either over dedicated landlines or through a Public Switched Telephone Network (PSTN 1009). Likewise, the connection between MD-IS 1003 and the various mobile data base stations 1001, 1001' controlled thereby is made in the same manner. However, some different signaling protocols are used than those found in the AMPS system.

In comparison to AMPS, the infra-structure requirements of CDPD are very small. CDPD base station equipment is preferably located at a cellular carrier's cell site with existing AMPS base station cellular equipment. The multiple access nature of the CDPD system makes it possible to provide substantial CDPD coverage to many users simultaneously with the installation of only one CDPD radio in a given sector. This multiple access is the result of a mobile end-system accessing the CDPD channel only when there is data to be sent.

The AMPS base station and the MDBS can use the same RF equipment if both are co-located. By contrast, the MTSO of the AMPS system and the MD-IS 1003 of the CDPD system do not have to be co-located in order to share RF links. In the AMPS system, the MTSO 1004 has the responsibility of connecting the AMPS base station and the mobile station to another party through a PSTN 1009. The intermediate system (data network 1006) of the CDPD corresponds to the use of the PSTN by the AMPS system. Like the AMPS system, the CDPD system must also use the public switch telephone network or another landline network for completing calls to remote parties or systems via a phone system terminal network (not shown). However, the CDPD system employs a different protocol than that used by the AMPS system for completing calls over a PSTN.

The MDBS maintains a number (up to the MDBS transmission capability) of channel streams across the airlink interface, as directed by the MD-IS controlling that MDBS. The MDBS instructs all wireless subscriber stations to change channels when necessary such as when an AMPS communication is detected on the CDPD channel. Each wireless subscriber station's terminal stream is carried on one channel stream at a time, normally selected by the mobile subscriber, preferably based upon data received from the MDBS regarding optimum channels for CDPD use. The forward and reverse traffic in a given cell (the terminal stream of the MDBS) is carried on a single DS0 trunk 1011, between the MDBS and the MD-IS. Communication between the MDBS and the MD-IS over the DS0 trunk follows standard formats such as T1.

Within the CDPD network, digital data is transmitted between the MDBS 1001 and the M-ES 1002 using Gaussian Minimum Shift Keying (GMSK) modulation. Transmissions from the base station to the wireless subscriber station M-ES are continuous. Those from wireless subscriber station M-ES to the MDBS use a burst mode in which wireless subscriber station M-ES accesses a channel only when it has data to send and the channel is not being used by other mobile wireless subscriber stations. This allows multiple mobile wireless subscriber stations to share a single channel, and for data transmission characterized by intermittent transactions of relatively small amounts of data, greatly reducing the connection time compared to that when sending digital data over conventional circuit-switched cellular modems.

Unlike the signaling schemes used in conventional cellular modems, which have been chosen based on the need to operate within the constraints of the existing voice signaling system, the GMSK modulation technique used for CDPD communication was explicitly selected with the intent of obtaining both very high bit transmission rates and good error performance in cellular channels. The fact that the choice of modulation was not constrained by a pre-existing signal structure allows CDPD systems to achieve substantially greater instantaneous bit rates at very low received signal levels when compared to those of conventional cellular modems. This means that CDPD communication systems will provide reliable, high speed data transmission in many areas where signal quality is inadequate for good cellular modem performance. Presently, the raw (baseband) digital data being transferred across CDPD include electronic mail messages, digital fax data, or other digital data representing a network connection such that files may be transferred as if currently connected to a local area network.

The mobile data intermediate system MD-IS 1003 handles the routing of packets for all visiting wireless subscriber stations in its serving area. Two services are performed by the MD-IS are: a registration service maintaining an information base of each M-ES currently registered in a particular serving location; and a re-address service, decapsulating forwarded packets and routing them to the correct cell. The serving MD-IS also administers authentication, authorization and accounting services for the network support service applications.

A CDPD communication system can operate with dedicated channels set aside from the pool of cellular voice channels and reserved for CDPD use. In the alternative, in a more typical mode of operation, the CDPD communication system can use idle time on channels that may also be used by AMPS communications. In this second case, the mobile data base station may perform "RF sniffing" to determine which channels are available and detect the onset of voice traffic on the channel currently being used for CDPD communication. If an AMPS cellular unit begins transmitting on a channel occupied by a CDPD communication, the CDPD unit ceases transmitting on that channel and switches to another available channel (a process called "channel hopping") or if no other channel is available, ceases transmission until a channel becomes available for CDPD use.

Although the CDPD system shares existing AMPS radio frequency channels, AMPS calls are given first priority, and they are always able to preempt the use of any channel being used by CDPD. However, the cellular carrier or service provider may opt to dedicate one or more channels to CDPD usage. In this case, AMPS calls will never attempt to pre-empt the channels dedicated to CDPD use.

In normal operation, the MDBS will carry out channel hopping to avoid channels to be used for AMPS communications. To do this, the MDBS performs a monitor activity on AMPS channels, and maintains a list of the status (occupied by voice or unused) for each channel available for CDPD use at the cell. The MDBS selects a channel for CDPD use from the unused channels in the list based on a combination of criteria (not specified in the CDPD standard). These could include such considerations as the likelihood that the channel will be required by the voice system in the near future, the amount of interference present on the channel, the amount of interference that the CDPD communication is likely to cause to other voice users in different cells, or on other sectors, and other factors. The MDBS transmits a list of all channels available for CDPD use (whether currently occupied by a voice communication or not) to the wireless subscriber stations. The MDBS may execute a channel hop before the channel is pre-empted by AMPS communication if the MDBS determines that another channel is more suitable. In such a case, the MDBS sends a message to the wireless subscriber stations commanding them to change to the specific channel selected, and then the MDBS executes the hop. This sort of hop is much more orderly and efficient than an unplanned hop since the wireless subscriber stations do not have to search for the next channel.

If the present CDPD channel is pre-empted by AMPS communication, the MDBS selects another channel from those unused by AMPS communications and immediately hops to it without informing the wireless subscriber station (an unplanned hop). The wireless subscriber station then determines that the CDPD signal is no longer present on the current channel and searches the other channels in the list to determine the channel (if any) to which the CDPD communication has hopped.

Normally, a subscriber station equipped for CDPD operation, as will be described, infra, is able to remain in a low-power, sleep mode. This sleeper dormant mode requires minimum power expenditure. Consequently, extended periods in the sleep mode will result in longer battery life for the subscriber station handset. One aspect of the present invention is to remain in the CDPD sleep mode as long and as often as possible.

Typically, the sleep mode of a subscriber station operating in the CDPD mode must be interrupted every 10–255 seconds to check for messages such as incoming paging signals directed to the subscriber station. Consequently, the subscriber station must go into a higher-powered state to check for incoming paging messages on a timely basis. If none are received, the subscriber station can drop back into the sleep mode to continue to limit power expenditure. While the subscriber station handset operating in the CDPD mode must periodically become active to check for incoming paging signals, it is also possible to arbitrarily move the handset from the sleep mode to a higher power mode to check for signals by inputting a command by the handset user. However, this is seldom done since current advances in subscriber station handset technology are directed to limiting power expenditure.

For example, by remaining in the CDPD sleep mode as often as possible, a battery's life can be extended so that at full transmission power, the handset is able to operate for at least an hour, and during standby time while monitoring for AMPS control channels, the subscriber station handset is able to operate for at least twelve hours. The sleep mode operation of a CDPD system and subscriber stations within that system is essentially a matter of predicting when the CDPD system will be sending a list of paging signals so that listening subscriber stations need monitor only for a short amount of time to determine if there are pending messages. To save power, subscriber stations must predict when to listen during the overall CDPD message flow depicted in FIG. 9. The timing of the sleep cycle of the subscriber stations to coincide with paging signals on a control message stream is described below.

The sleep mode procedure operates in the "multiple frame established state". In this operation, if no frames are exchanged on the data link connection between a particular wireless subscriber station M-ES and the MDBS after a period of time defined by the parameter T203, the data link connection may be placed in the Temporary Equipment Identifier (TEI) sleep state for the handset. While in this state, the overall network will not attempt to transmit information destined for that M-ES. If, after entering the sleep state, new frames become extant and waiting initial transmission, the network will broadcast a predetermined message at periodic intervals. This message contains a list of TEI's for which channel data is pending. The wireless subscriber stations are expected to wake up at periodic intervals to determine if data from them is pending, and notify the network that they are willing to receive the pending data. Normally, the M-ES may exit the sleep state at any time.

A first parameter T203 represents the maximum time allowed without frames being exchanged on the data link connection before the M-ES is expected to enter the CDPD sleep mode. On the user/subscriber (M-ES) side, timing of the parameter T203 is started or restarted upon transmission of a data link layer frame of any type on the reverse channel (from the M-ES to the MDBS). On the network side, the timing of parameter T203 for a particular M-ES is started or restarted upon receipt of a data link layer frame (of any type) on the CDPD channel. If the value of parameter T203 expires, the data link entity will enter the TEI sleep state, and issue an indication of this state from the user's side. The layer management entity may take power conserving measures, such as disabling the subscriber radio receiver or other non-essential portions of its circuitry.

A second parameter, T204, represents the time intervals at which the network side broadcasts TEI notification of pending data for a sleeping M-ES. A single timing operation for parameter T204 is maintained for a channel stream; all user side management entities discover and synchronize to particular channel streams T204, via the TEI notification procedure described in Section 6.8.8 of Part 403 of the CDPD specification. The number of frames queued in the maximum time for which the network attempts to notify an M-ES in the TEI sleep state is implementation dependent. The network releases a data link connection and discards all queued frames for which the TEI sleep notification procedures are aborted. The maximum number of attempts to notify an M-ES in the TEI sleep state of pending network transmissions is designated system parameter N204. The network normally aborts a TEI sleep notification procedure for a TEI which has been included in a number expressed as parameter N204, of successive TEI notification messages without a response from that M-ES. Consequently, M-ES will be de-registered with the CDPD system.

A complete description of the aforementioned operation is found in Section 6.8 of Part 403 of the CDPD specification.

In operation according to this Part of the CDPD specification, if no data is sent in either direction over the air link for a certain length of time (parameter T203), the M-ES will go into the sleep mode and the network will assume that the M-ES is asleep, as indicated at step 703. Once the M-ES enters the sleep mode another timing operation is carried out in both the M-ES and the MD-IS.

The total length of this period is defined by the product of parameters T204 and N204, previously described. If the network has data to deliver to the M-ES that is believed to be asleep, the network will add the TEI for that M-ES to a list of sleeping units on a particular channel stream, that have data waiting for them. However, the network will not send that data. For each time frame measured by the parameter T204, the network will send a TEI indication for a particular wireless subscriber station M-ES indicating that there is data waiting for that wireless subscriber station. Thus, the wireless subscriber station will have to be monitoring the CDPD channel at some time during the time frame defined by T204 in order to determine if a message is waiting for that wireless-subscriber station.

The list of wireless subscriber stations having waiting messages is broadcast to all stations on that channel stream periodically in a TEI notification message. The time between such notification is specified by the parameter T204. This parameter determines the length of time the M-ES is expected to sleep before waking for its messages. When the M-ES awakens, it waits until it receives a notification message. If the TEI of that M-ES is on the list, it notifies the network that it is ready to receive data. If the TEI of a particular M-ES is not on that list, that M-ES goes back to sleep for another period of time, normally specified by the parameter T204. If a consecutive number of notifications (specified by the parameter N204) have been made for a TEI without the subject M-ES indicating that it is ready to receive data, the network will then assume that the M-ES is no longer present on the CDPD system and discards the data that was pending for that M-ES, as indicated at step 705.

If the particular M-ES is handling normal AMPS communication for a greater amount of time than that encompassed by the product of parameters N204 and T204, then the data being held for that M-ES is discarded by the network. Thus, CDPD communication is lost due to the normal operation of AMPS communication. Thus, it is necessary that the subscriber station M-ES remain tune to the CDPD channel long enough to monitor for its TEI. This entails additional time in the awake state, and as a result, additional battery drain.

Since AMPS mode operation is recognized as having preference over CDPD mode operation, the handset preferably spends most of its time monitoring for AMPS communication and just enough time in the CDPD mode to pick up indication of messages for a wireless subscriber station and avoid de-registration. One mode of operating a wireless subscriber station M-ES involves remaining in the AMPS mode monitoring an AMPS control channel while periodically breaking away to poll the CDPD network. When breaking away from the AMPS mode, the wireless subscriber station M-ES sends a polling signal to the CDPD network to evoke a response and determine if there is any data waiting on the CDPD network for transmission to that wireless subscriber station. After listening for an appropriate amount of time (usually T203) after the response for a return message from the CDPD network, the wireless subscriber station then switches modes and tunes back to the AMPS channel. Preferably this switch-over occurs before any re-transmission of relevant AMPS pages that might have been missed while the wireless subscriber station was in the CDPD mode.

FIG. 9 depicts the continuous, repetitious data stream constituting the CDPD data transmitted from an MDBS such as 1001 in FIG. 10. Segment 90 represents the data contained in one repetition, approximately sixty blocks in length where each block is approximately fifty milliseconds. The aforementioned timing sequence is not critical to the present invention since there is no need for a subscriber station to be awake during only a portion of the segment to listen for TEI messages. Rather, the present invention is directed to the registration or handshake routine that occurs when a roaming subscriber station enters a CDPD system. This process requires that the subscriber station listen for at least one segment to obtain all the necessary control data (found in blocks 93), as well as channel identification data 96 in order to properly register on the CDPD system. It may be necessary for a new subscriber station to listen for several segments (90) to obtain all of the data necessary. It is noted that the arrangement of segment 90 is merely suggestive of one of the many arrangements possible for a CDPD data stream.

For example, normally the control messages in blocks 93 are distributed over the entire segment 90. Usually, only the channel ID contained in block 96 is always in the same place within the segment 90. To save energy and thus conserve battery life, it is already known to put all of the TEI messages in one group of data blocks 92 so that the occurrence of these messages within the data stream can be more easily predicted. In an effective prediction program, a subscriber station can listen on the CDPD channel only during the time that the TEI messages are being broadcast. During all other portions of segment 90, the subscriber station can power down into the sleep mode.

In order to help predict the timing of the TEI messages, it has been proposed that an initial block 91 indicating the beginning of a segment 90 be transmitted in a form that is easily identifiable by all listening subscriber stations. The end of the segment 90 is easily identified also by the presence of the channel ID block 96. The data contained therein is absolutely necessary for the proper operation of any subscriber station on the CDPD system. Consequently, it is necessary for a subscriber station to remain in a listening mode until this data has been received.

The channel identification message contained in block 96 provides timing information, parameters for control of the MAC layer (as described in the CDPD specification, Version 1.1, Part 402), and other identifying parameters regarding channel use. Other control messages are contained in blocks 93. These include channel configuration messages which provide information about channels used in neighboring cells so that efficient cell transfer can take place. Also included are channel access parameters, and the switched channel message which is used to control subscribers so that they will switch to another channel. Control blocks 93 also include alternative carrier or service provider messages which provides data to the subscriber regarding other carrier or service providers that may be available.

In the present invention, this last type of information is expanded to include the SID list discussed, supra in this application. Normally, the control messages contained in blocks 93 are distributed at quasi-regular intervals throughout segment 90. However, because this arrangement is subject to queuing delays and internal propagation delays, it has been found to be more efficient to group all of the control messages in the group of blocks as shown at 93 in FIG. 9. However, this is not the only data flow arrangement that will support the present invention. All that is required is that the SID list be identifiable and that a segment 90 provide enough room to contain all of the data needed so that a subscriber station handset can carry out the desired band selection.

To facilitate the handling of the data segment 90 by a roaming subscriber station, the use of an initial block 91 having universal characteristics to mark it as an initial block is most helpful. Once the beginning of a segment 90 has been identified by the protection of initial block 91, all of the necessary registration data can be acquired simply by listening until the occurrence of the next initial block 91'. This sequence greatly simplifies control and operation of the subscriber station handset during registration.

A single block such as reference block 91 contains 378 bits, of which 96 bits are redundancy bits for forward error correction. Under some circumstances, the forward error correction bits can be ignored or used for other purposes. Thus, the total of 378 bits may be available for control messages. A number of the bits are necessary in initial block 21 in order to provide the universal identification indicative of an initial block. This information is preferably pre-programmed into all handsets and used by all CDPD system carriers in order to accommodate both roaming subscribers, and to more easily facilitate prediction of the occurrence of the TEI blocks 92. Thus, if the SID list data is not particularly extensive, it could be contained within the initial block 91. If on the other hand, the use of more than two alternative bands is available, or extensive features regarding each SID are meant to be conveyed to the roaming subscriber, this data could be placed within the control blocks 93. However, this does not change the operation of the roaming subscriber which must listen to the entire data segment 90 in order to carry out registration.

If the normal control block space 93 is not sufficient for all of the SID list information, then another portion of segment 90 can be set aside. This space can be designated SID messages 95 and can be set adjacent the channel ID block 96 at the end of segment 90. In order to set aside the SID message blocks 95, it may be necessary to abbreviate normal message flow 94. The truncation of message flow in a cellular packet data system is already well known and is carried out for a variety of reasons to maintain the integrity of the messages. Consequently, it is not necessary to disclose a new inventive concept covering the technique for normal message flow abbreviation. The special SID messages portion 95 may be necessitated by a large number of available SIDs in a particular area; extensive information regarding each of the SIDs (anything from control and voice frequencies to calling features available from each carrier represented by a particular SID). The amount of information required about a particular SID may vary depending upon how much information has been pre-programmed into a particular subscriber station. It is possible that the SID list information that can be contained in the initial block 91. This may be sufficient for the vast majority of roaming subscribers entering the system.

As previously described with respect to analog cellular voice communications, digits indicative of a version number for a SID list can also be included in either the initial block 91, the control blocks 93, or the SID messages 95. This could be important since under some circumstances a roaming subscriber may remain in the new system long enough that changes to the SID list are made in the system. Consequently, the subscriber station will then have a need to recognize the latest version of the SID list and acquire for data pertaining to those changes. If the entire SID list cannot be contained in initial block 91, it may be possible to provide bits indicative of the latest version number so that a subscriber station that is periodically checking for changes in the SID list can listen only as long as necessary to obtain the needed information. This can be facilitated by providing timing data at the initial block so that the subscriber station is given a time delay from the initial timing block 91 to the occurrence of the SID list information, whether in the control blocks 93 or in the SID messages 95. Conceivably, a subscriber station that has previously registered with the CDPD system could then go into the sleep mode until the time delay had transpired, and then turn to the awake mode to monitor for the SID list data at the correct time interval.

Subscriber Station Control

Figure 11:
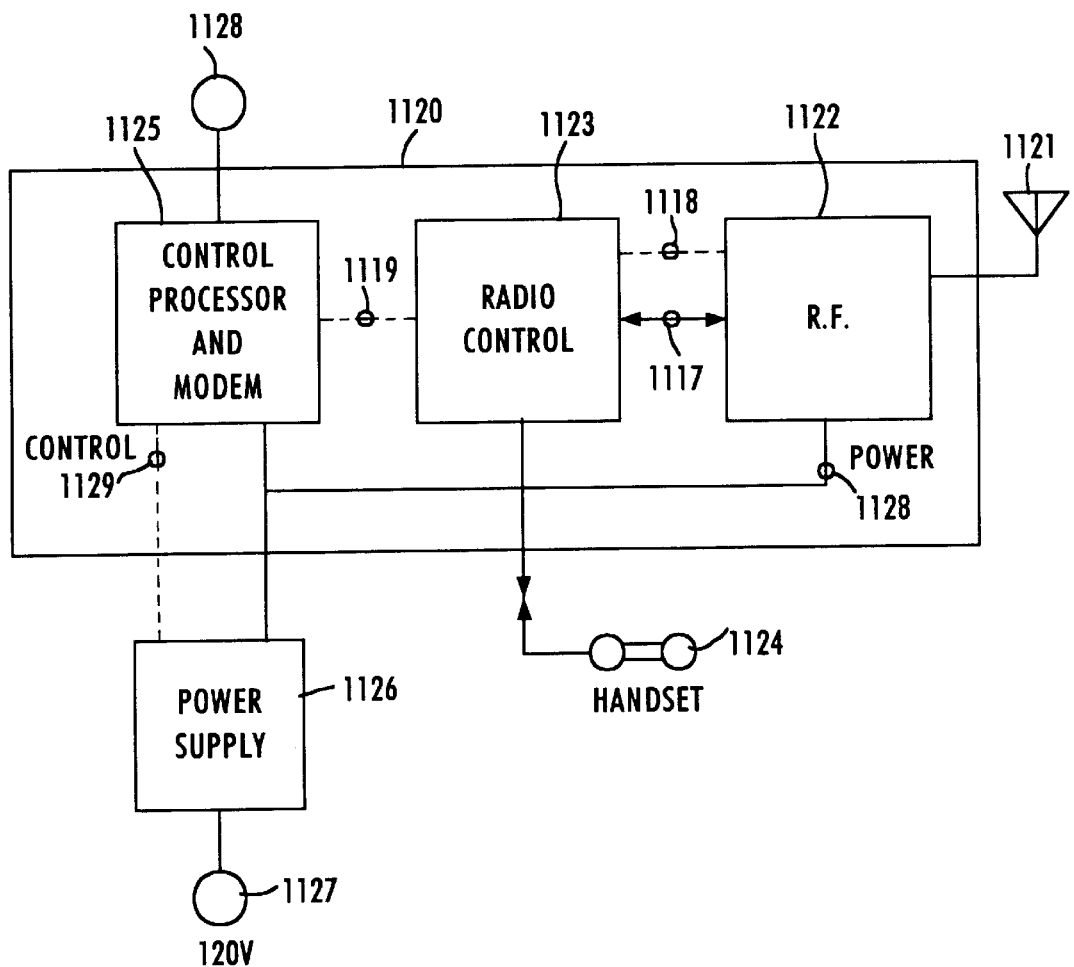
FIG. 11 is a block diagram of a subscriber station handset supporting both AMPS and CDPD operation.

Integration of cellular voice communication and data communication is facilitated by the device of FIG. 11. This wireless subscriber station is programmable and contains all of the functionality previously described with respect to standard analog voice cellular subscriber stations programmed for the selection of a preferred SID. In this respect, the subscriber station of FIG. 11, and the previously described subscriber stations, are the same. The device of FIG. 11 differs in that the processors constituting radio control 1123 and the control processor 1125 have the capability to control both cellular voice (preferably AMPS) and CDPD communication, in conjunction with each other. Cellular subscriber stations having such functionality are already known, and are on the market. The representation in FIG. 11 simply depicts the functionality necessary to accommodate the programming which completes the final aspect of the present invention.

This device includes a power supply responsive to the cycles of CDPD communication and AMPS voice communication. The power supply also accommodates high voltage (120 volts AC) output for high power radio devices such as satellite communication systems and short wave amateur radio communications. Handset 1120 depicted in FIG. 11 is similar to a conventional portable radio telephone handset in that it includes a radio frequency module 1122 having at least one radio frequency transceiver. However, the radio frequency module could include a plurality of transceivers operating at different power levels and different frequencies as described earlier with respect to Personal Communication Systems (PCS). The radio frequency transceiver uses a main antenna 1121 for both receiving and transmitting the various types of signals handled by the handset, such as PCS, AMPS communication, circuit switched cellular data communication, and CDPD communication. If a plurality of transceivers are used, a plurality of antennas can also be provided. Another alternative is a diversity antenna (not shown), used as a backup to the main antenna 1121 for reception purposes under certain adverse conditions.

Radio control processor 1123 carries out the functions performed in any cellular handset. These include control of the registration sequence and handoff sequence in accordance with the overall cellular system constraints. Other functions include interfacing with a standard telephone handset 1124 available to the handset user for transmission and receipt of voice communication. Radio control processor 1123 sends voice and data communication via link 1117 to the RF module 1122, as well as control data over control data link 1118. Only voice communication is conducted between handset 1124 and radio control processor 1123. In addition, radio control processor 1123 is connected via data link 1119 to the control processor and modem 1125.

Processor 1125 is dedicated to the control of data communication, in particular, CDPD communication. The requirements for the programming of control processor 1125 are set forth in the CDPD specification (incorporated herein by reference). As previously stated, CDPD control applies to the overall radio control a mobile end user station 1120, but is subject to default when AMPS or other cellular voice communication is required. It is noted that AMPS communication is subject to default in accordance with the duty cycle of PCS communications described, supra. Consequently, the CDPD system will interpret PCS usage as being equivalent to AMPS usage. Control of the PCS operation can be relegated either to radio control processor 1123 or control processor/modem 1125. Programming such processors to carry out AMPS and PCS functions is a technique well known to practitioners in the radio telephone art.

Since CDPD communication, as well as personal communication systems are subject to the constraints of cellular communication systems in accordance with the IS-54B standard, power requirements for the output of the mobile end user station are predetermined. When the handset 1124 and the overall transceiver are combined for close contact with the user, no more than 0.25 watts of power can be transmitted. In the alternative, 0.6 watts are permitted when handset 1124 is not integrated with the RF Section 1122, including antenna 1121.

Thus, the requirements of power supply 1126 are well known for standard cellular operation. However, the use of CDPD communication creates a whole new set of requirements for power supply 1126 if it is to be responsive to the demands of the mobile end station 1120 while still maintaining the efficient use of power. Thus, control processor 1125 carries out the additional operation of controlling power supply 1126 via control data link 1129. This additional control is required to conform the power supply operation to coordinated interaction between the CDPD operating cycle and AMPS operations, especially when cellular voice operation does not always pre-empt CDPD operation.

The high voltage output 1127 is necessary to provide capacity for high power applications, such as short wave communications, considered desirable in the comprehensive mobile communication system. Such systems would operate in addition to the cellular voice/data system represented by end user station 1120, and are not shown since they are already well-known in mobile environment. For most efficient operation of power supply 1126, the operation of the high voltage output 1127 must be integrated with the operation of the low power equipment represented by 1120. Such operation is better appreciated when examined in view of a more detailed consideration of CDPD operation.

In the CDPD mode, a cellular handset such as end user station 1120 operates as a fully functional CDPD mobile terminal. In order to participate in the CDPD network, the station communicates with a mobile data base station as depicted in FIG. 1 using GMSK modulation on AMPS radio frequencies and occupying an AMPS channel. According to this operation, the end user station will monitor received signal strength. Based upon the detected values of the received signal strength, the user station will locate the strongest CDPD channel and register on that channel in a local CDPD cell associated with a CDPD mobile data base station as depicted in FIG. 1. The end user station will also locate and switch to a new CDPD channel whenever the local mobile data base station switches channels. The CDPD system supports hand-off to an adjacent cell if the mobile end user station changes location so as to cause received signal level changes.

By operating in the CDPD mode as described above, the subject end user station has the capability of sending data messages such as electronic mail input by a handset keypad (not shown) to others within the CDPD network. The end user station can also be used to transport data (via electronic mail/paging/fax) to and from a host computer associated with the end user station via an appropriate I/O port (connecting the end user station to the computer) and the CDPD network. Since the hand-off sequence in the CDPD mode mitigates against data loss, as indicated in the CDPD specification, successful data transfer can take place even when the mobile end user station is moving from one cell site to another. While in the CDPD mode, the mobile end user station is able to conserve battery power by remaining in a dormant or "sleep" protocol when data is not being sent or received. The characteristics of the sleep mode have been previously described in this application and are part of the CDPD specification (previously incorporated herein by reference).

Because of the higher priority assigned to cellular communications due to cost and reliability, other forms of communication will, of necessity, be subrogated to both AMPS and CDPD communications as well as PCS operation under normal circumstances. This operation reduces the burden on the battery should the vehicle containing the end-user station not be operating at the time of communication. Thus, high powered communication (such as citizen band, satellite or short wave radio amateur) are assigned a subsidiary role in the operation of the mobile end user station.

Figure 12:
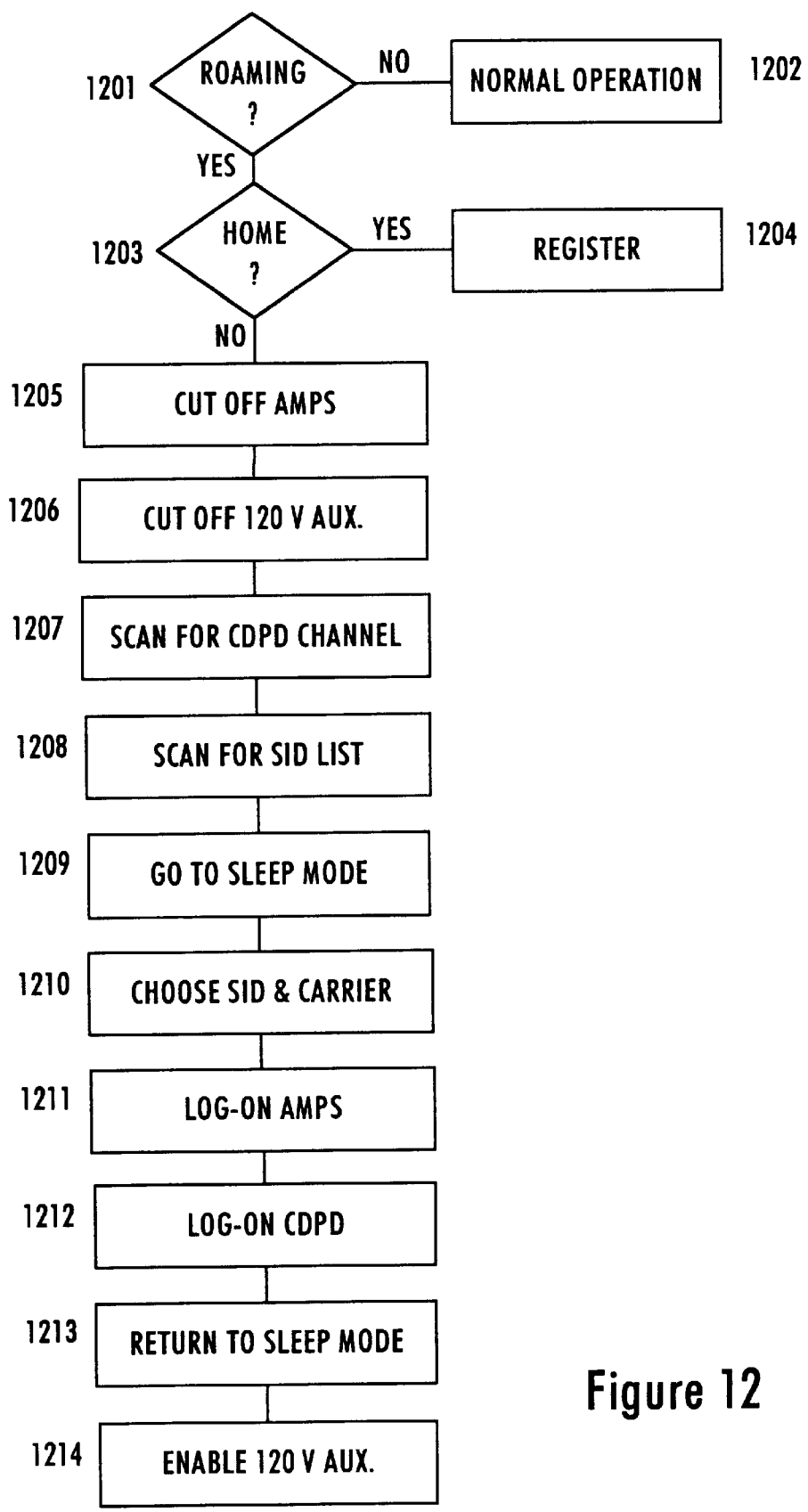
FIG. 12 is a flow diagram depicting the sequence of operation of a system using the data arrangement of FIG. 11.

FIG. 12 depicts the operation of the subscriber station that has been programmed as part of the present invention. At step 1201, a determination is made whether the subscriber station is in a roaming state or not. If not, normal operation will continue as indicated at step 1202. If on the other hand, a roaming state is detected, a determination is made at 1203 if the home carrier or service provider is available as a foreign service provider. If this is true, the handset will automatically register with the home carrier at step 1204, and receive the benefits of operating within the jurisdiction of the home carrier.

If on the other hand, the home carrier is not available, the subscriber station must enter into a new mode of operation. First, a subscriber station cuts off all AMPS operations at step 1205. If desired by the subscriber, this step can be suspended if an ongoing AMPS communication is being conducted. In such a case, the AMPS communication would be allowed to continue until complete. At which point, AMPS communication would be cut off at the subscriber station. Likewise, at step 1206, the 120 volt auxiliary output (generally used for short wave radio equipment or other high powered communications devices) would also be cut off at step 1206.

At step 1207, the subscriber station will scan for a CDPD channel as is done in a normal registration operation in the CDPD mode. Once the CDPD channel has been located, the subscriber station will obtain all of the necessary control messages and channel ID information. The subscriber station will also obtain all of the SID list information deemed necessary by the pre-programming of the subscriber station as indicated at step 1208. As previously described, the SID list information obtained may be no more than digits indicating the latest version of a SID list that may already be contained in the memory of the subscriber station. On the other hand, the SID list information may be as extensive as a list of at least three different bands, control channels and voice channels, as well as calling features provided by each system carrier associated with each of the SIDs.

By the time the subscriber station obtains all of the SID list information believed necessary, the subscriber station may have also obtained all of the channel ID and other control data necessary to carry out registration with the CDPD system. However, this will not immediately take place. Rather, at step 1209, the subscriber station will enter the sleep mode and maintain a low power configuration. During this time, the selection of an available SID will be made at step 210. If the subscriber wishes to make any manual inputs or overrides, this can be done during the sleep mode. Once the decision regarding the SID has been made, an analog cellular voice (such as AMPS) mode log-on will be carried out at step 1211. Subsequent to this, normal log-on will take place for the CDPD system at step 1212.

It is noted that if all of the SID list information was gathered by scanning only initial block 91 (in FIG. 9), and the subscriber station was programmed to go into the sleep mode immediately upon obtaining this information, it may be necessary for the subscriber station to scan the CDPD channel once more to monitor the entirety of at least one data segment 90 to obtain all the necessary control information. After logging on to the CDPD system, the subscriber station will return to the sleep mode at step 1213 in order to conserve power, as is consistent with the purpose of this invention. Only after log-on has occurred for AMPS and CDPD and no communication is detected for either, can the auxiliary 120 volt power source be re-activated for auxiliary high voltage communication. It is noted that this power output is normally disabled upon the occurrence of either AMPS or CDPD communication. However, this control can be overridden by the operator of the subscriber station should communication enabled by the 120 volt output be assigned a higher priority than AMPS or CDPD communication.

However, the user of the vehicle may wish to assign other priorities. Thus, override control 1128 (in FIG. 11) can be used to override the lock-out and permit communication requiring the 120 volts AC output regardless of AMPS or CDPD activity. Further, the keypad handset (not shown) can be used to program instructions in control processor 1125 in order to provide any arrangement of priorities found to be desirable for the power supply 1126. Thus, any power supply cycle desired can be programmed by the user of the terminal.

The conventional art discloses power supply circuits that are controllable to change output based upon an input of control signals. Such control signals can be programmed into a microprocessor such as those used to carry out the function of control processor and modem 1125. In the present invention, the control signals are generated responsive to the recognition of a CDPD communication and a series of timing circuits (contained in control processor 1125) in order to track the operation of the CDPD active and sleep modes. The programming and control of the power supply is also arranged to accommodate the power output necessary for alternative forms of communication within the vehicle containing the mobile end user station.

Although a number of arrangements of the present invention have been mentioned by way of example, it is not intended that the invention be limited thereto. For example, the present invention can be adapted to use a plurality of different sources to update the SID lists in the CDPD system. It is therefore intended that the protection granted hereon be limited only by the definition contained in the appended claims and equivalents thereof. Accordingly, this invention should be considered to include any and all configurations, modifications, variations, combinations or equivalent arrangements falling within the scope of the appended claims.

We claim:

1. A method of registering a radio telephone subscriber unit on an analog cellular voice radio communication system, said analog cellular voice communication system having a plurality of cell sites for communication with a plurality of radio telephone subscriber units over a plurality of radio frequencies in at least one of a plurality of frequency bands, and being controlled by at least one controller, said method comprising the steps of:

(a) generating a system identification number (SID) associated with each of said plurality of frequency bands and service carriers associated therewith;

(b) broadcasting a list of said generated SIDs on a cellular digital packet data (CDPD) channel in a data stream constituted by:
      (i) an initial block with recognition data;
      (ii) temporary equipment identifier (TEI) data;
      (iii) system control data;
      (iv) communication information data;
      (v) channel identification data; and
      (vi) said generated SID list;

(c) at a radio telephone subscriber unit selecting a SID based upon a comparison of said generated SID list received in said data stream by said radio telephone subscriber unit and a list of preferred SIDs stored in said radio telephone subscriber unit;

(d) registering with an analog cellular voice system corresponding to said selected SID; and (e) operating said radio telephone subscriber unit to remain in sleep mode with response to CDPD operation.

2. The method of claim 1, wherein said generated SID list is contained within said initial block.

3. The method of claim 1, wherein said generated SID list is contained within said control data.

4. The method of claim 1, wherein said generated SID list immediately precedes said channel ID.

\* \* \* \* \*